United States Patent
Adachi

(10) Patent No.: US 11,803,284 B2
(45) Date of Patent: Oct. 31, 2023

(54) DETECTING DEVICE AND DISPLAY DEVICE

(71) Applicant: Japan Display Inc., Tokyo (JP)

(72) Inventor: Koichiro Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/752,027

(22) Filed: May 24, 2022

(65) Prior Publication Data

US 2022/0291785 A1 Sep. 15, 2022

Related U.S. Application Data

(63) Continuation of application No. PCT/JP2020/044040, filed on Nov. 26, 2020.

(30) Foreign Application Priority Data

Nov. 29, 2019 (JP) .................. 2019-217567

(51) Int. Cl.
*G06F 3/044* (2006.01)
*G02F 1/1343* (2006.01)
*G02F 1/1333* (2006.01)
*G02F 1/1335* (2006.01)

(52) U.S. Cl.
CPC ........ *G06F 3/0448* (2019.05); *G02F 1/13338* (2013.01); *G02F 1/13439* (2013.01); *G02F 1/133514* (2013.01); *G02F 1/134345* (2021.01); *G06F 3/0446* (2019.05)

(58) Field of Classification Search
CPC .... G06F 3/0448; G06F 3/0446; G06F 3/0412; G02F 1/13338; G02F 1/133514; G02F 1/134345; G02F 1/13439; G09F 9/30
See application file for complete search history.

(56) References Cited

U.S. PATENT DOCUMENTS

| | | |
|---|---|---|
| 2014/0246225 A1 | 9/2014 | Mizuno et al. |
| 2015/0042909 A1 | 2/2015 | Sekiguchi |
| 2017/0003788 A1 | 1/2017 | Sekiguchi |

(Continued)

FOREIGN PATENT DOCUMENTS

| | | |
|---|---|---|
| JP | 2013-152579 A | 8/2013 |
| JP | 2015-035122 A | 2/2015 |
| JP | 2017-198729 A | 11/2017 |

OTHER PUBLICATIONS

International Search Report issued in International Patent Application No. PCT/JP2020/044040 dated Jan. 12, 2021 and English translation of same. 5 pages.

(Continued)

*Primary Examiner* — Amit Chatly
(74) *Attorney, Agent, or Firm* — K&L Gates LLP

(57) ABSTRACT

A detecting device comprising: a plurality of detection electrodes extending in a first direction along a substrate and disposed apart from each other in a second direction orthogonal to the first direction; and a plurality of dummy electrodes provided between the detection electrodes, wherein the detection electrodes have a plurality of openings, the openings of the detection electrodes are arrayed in a triangular grid, the dummy electrodes are arrayed in a triangular grid, an end of each of the detection electrodes in the second direction has: a plurality of recesses; and a plurality of protrusions.

10 Claims, 28 Drawing Sheets

(56) References Cited

U.S. PATENT DOCUMENTS

| | | | |
|---|---|---|---|
| 2017/0308211 A1* | 10/2017 | Adachi | G02F 1/134309 |
| 2017/0315647 A1 | 11/2017 | Sekiguchi | |
| 2021/0165532 A1* | 6/2021 | Zhang | G06F 3/0446 |
| 2022/0283459 A1* | 9/2022 | Adachi | G09F 9/30 |

OTHER PUBLICATIONS

Written Opinion issued in International Patent Application No. PCT/JP2020/044040 dated Jan. 12, 2021. 3 pages.

* cited by examiner

DETECTING DEVICE AND DISPLAY DEVICE

CROSS-REFERENCE TO RELATED APPLICATION

This application is a continuation of International Patent Application No. PCT/JP2020/044040 filed on Nov. 26, 2020 which designates the United States, incorporated herein by reference, and which claims the benefit of priority from Japanese Patent Application No. 2019-217567 filed on Nov. 29, 2019, incorporated herein by reference.

BACKGROUND

1. Technical Field

The present disclosure relates to a detecting device and a display device.

2. Description of the Related Art

Detecting devices, what are called touch panels, that detect contact or proximity (hereinafter, contact and proximity are collectively referred to as touch) of an external object have recently been attracting attention. Touch panels are mounted on or integrated with the upper surface of a display device, such as a liquid crystal display device, and are used as display devices. The display device described in Japanese Patent Application Laid-open Publication No. 2015-035122 (JP-A-2015-035122) includes drive electrodes and detection electrodes intersecting the drive electrodes. Capacitance is formed at the intersections of the drive electrodes and the detection electrodes. When an external object touches the intersection, the amount of electric charge accumulated in the capacitance of the intersection changes. The display device detects a change in the amount of electric charge at the intersection and determines whether an external object touches the display device.

The display device includes a plurality of detection electrodes. The detection electrodes are disposed apart from each other in the extending direction of the drive electrodes. The space between the detection electrodes is a non-detection region that does not detect a touch of an external object. The detection electrodes of the display device described in JP-A-2015-035122 have a plurality of openings. The non-detection region is provided with a plurality of dummy electrodes formed into a circular shape. The openings of the detection electrodes and the dummy electrodes are formed by pattern processing and are regularly arrayed. As a result, the mesh shape formed by the drive electrodes and the detection electrodes is hard to visually recognize.

The end of the detection electrode serves as a boundary with the non-detection region. The end of the detection electrode described in JP-A-2015-035122 has a plurality of semicircular parts cut off in a semicircular shape and linear parts connecting the ends of the semicircular parts. The semicircular parts and the linear parts are alternately and continuously formed at the end of the detection electrode. When light is incident on the end of the detection electrode, linear light reflected by the linear part may possibly be visually recognized depending on the angle of the incident light.

An object of the present disclosure is to provide a detecting device and a display device that make linear reflected light hard to visually recognize.

SUMMARY

A detecting device according to an embodiment of the present disclosure comprising: a plurality of detection electrodes extending in a first direction along a substrate and disposed apart from each other in a second direction orthogonal to the first direction; and a plurality of dummy electrodes provided between the detection electrodes, wherein the detection electrodes have a plurality of openings, the openings of the detection electrodes are arrayed in a triangular grid, the dummy electrodes are arrayed in a triangular grid, an end of each of the detection electrodes in the second direction has: a plurality of recesses each formed into a circular arc shape along a first virtual circle having the same diameter as the diameter of the opening of the detection electrode and recessed toward inside of the detection electrode; and a plurality of protrusions each formed into a circular arc shape along a second virtual circle having the same diameter as the diameter of the dummy electrode and protruding toward outside of the detection electrode, the recesses and the protrusions being alternately and continuously formed in the first direction, the first virtual circle and the second virtual circle are alternately arrayed in the first direction, the second virtual circle is tangent to two of the first virtual circles adjacent to each other in the first direction, the first virtual circle and two of the openings are disposed in a triangular grid, and the second virtual circle and two of the dummy electrodes are disposed in a triangular grid.

A display device according to an embodiment of the present disclosure comprising: the detecting device above; a display part; and a color filter provided on a display surface of the display part, wherein the color filter includes a first color filter provided in a first sub-pixel region, a second color filter provided in a second sub-pixel region, and a third color filter provided in a third sub-pixel region, the first color filter, the second color filter, and the third color filter being arrayed in order from one side to the other in the first direction, and the first color filter, the second color filter, and the third color filter are each disposed with the color filter in the same color being adjacent thereto in the second direction.

A detecting device according to an embodiment of the present disclosure comprising: a plurality of electrodes having a plane parallel to a substrate, wherein the electrodes each have a rectangular shape surrounded by a plurality of ends, each of the ends has: a recess having a circular arc shape recessed from outside toward inside of the plane; and a protrusion having a circular arc shape protruding from inside toward outside of the plane, and the recess and the protrusion are formed alternately and continuously along each of the ends of the electrode.

A display device according to an embodiment of the present disclosure comprising: the detecting device above; and a display part.

DETAILED DESCRIPTION

Figure 1:
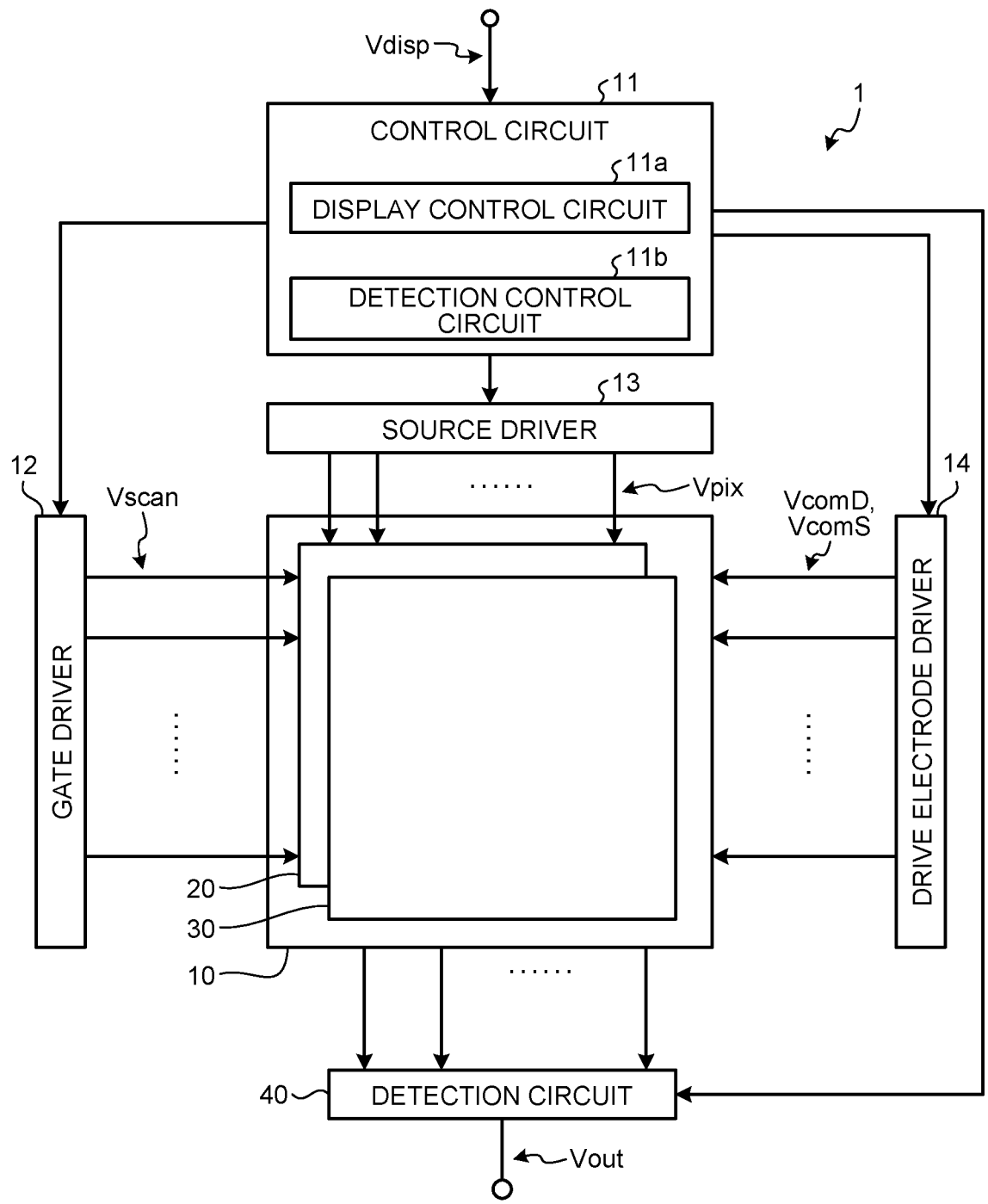
FIG. 1 is a block diagram of an example of the configuration of a display device according to a first embodiment.

Exemplary aspects (embodiments) to embody a detecting device according to the present disclosure are described below in greater detail with reference to the accompanying drawings. The contents described in the embodiments below are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the invention and easily conceivable by those skilled in the art naturally fall within the scope of the present disclosure. To make the explanation more specific, the drawings may possibly illustrate the width, the thickness, the shape, and other elements of each component more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

First Embodiment

FIG. 1 is a block diagram of an example of the configuration of a display device according to a first embodiment. As illustrated in FIG. 1, a display device 1 includes a display part 20, a detector 30, a control circuit 11, a gate driver 12, a source driver 13, a drive electrode driver 14, and a detection circuit 40. The display part 20 and the detector 30 constitute a panel part 10. The panel part 10 according to the present embodiment is what is called an in-cell detection panel that uses at least part of an electrode layer (drive electrodes Tx) constituting the display part 20 also as an electrode layer (drive electrodes) constituting the detector 30. The panel part 10 may be what is called an on-cell detection panel in which the detector 30 is provided on a substrate and an organic film, such as a sealing film, constituting the display part 20.

The control circuit 11 is a circuit that supplies control signals to the gate driver 12, the source driver 13, the drive electrode driver 14, and the detection circuit 40 based on video signals Vdisp supplied from the outside to control their operations. The control circuit 11 includes a display control circuit 11a and a detection control circuit 11b, for example. The display control circuit 11a controls the gate driver 12, the source driver 13, and the drive electrode driver 14. The detection control circuit 11b controls the drive electrode driver 14 and the detection circuit 40. In other words, the control circuit 11 performs a display operation by the display part 20 and a detection operation by the detector 30 in a time-division manner based on the control signals. The gate driver 12 is a circuit that selects display elements (sub-pixels SPix) of the display part 20 to be driven for display based on the control signals supplied from the control circuit 11. More specifically, the gate driver 12 is a circuit that sequentially selects a scanning line GCL (one horizontal line) coupled to a plurality of display elements and supplies scanning signals Vscan to the selected scanning line GCL. The source driver 13 is a circuit that supplies pixel signals Vpix to the display elements (sub-pixels SPix) of the display part 20 based on the control signals supplied from the control circuit 11. The drive electrode driver 14 is a circuit that supplies drive signals Vcom to the drive electrodes Tx (refer to FIG. 2) included in the display part 20 and the detector 30 based on the control signals supplied from the control circuit 11. More specifically, the drive electrode driver 14 supplies display drive signals VcomD to the drive electrodes Tx constituting the display part 20 and supplies detection drive signals VcomS to the drive electrodes Tx constituting the detector 30.

The display part 20 is a display panel including display elements that display an image, for example. The display part 20 according to the present embodiment is a liquid crystal display panel including liquid crystal elements LC as the display elements. The display part 20 is a display panel that displays an image when the display elements selected by the gate driver 12 are supplied with the pixel signals Vpix from the source driver 13. The display part 20 is not limited thereto and may be a light-emitting display panel including light-emitting elements, such as organic or inorganic light-emitting elements, as the display elements or an electrophoretic display panel including electrophoretic elements as the display elements, for example.

The detector 30 is a detection panel including detection elements that detect a touch. The detector 30 detects contact or proximity of an external conductor. The detector 30 is a capacitive detection panel that outputs detection signals indicating a change in capacitance due to contact or proximity of an external conductor, for example. The detection circuit 40 is a circuit that outputs output signals Vout based on the control signals supplied from the control circuit 11 and the detection signals supplied from the detector 30. More specifically, the detection circuit 40 includes an amplification circuit and an A/D conversion circuit. The amplification circuit amplifies the detection signals output from the detection elements (detection electrodes Rx). The A/D conversion circuit converts analog signals into digital signals. The detection circuit 40 also includes a signal processing circuit, such as a noise removing circuit like a band-pass filter, and a coordinate extraction circuit that derives coordinates at which a touch input is performed, for example. The detection circuit 40 may output the detection signals received from the detection elements (detection electrodes Rx) as the output signals Vout without any change. Alternatively, the detection circuit 40 may output the signals resulting from noise removal by the signal processing circuit or the signals indicating the coordinates derived by the coordinate extraction circuit as the output signals Vout.

Figure 2:
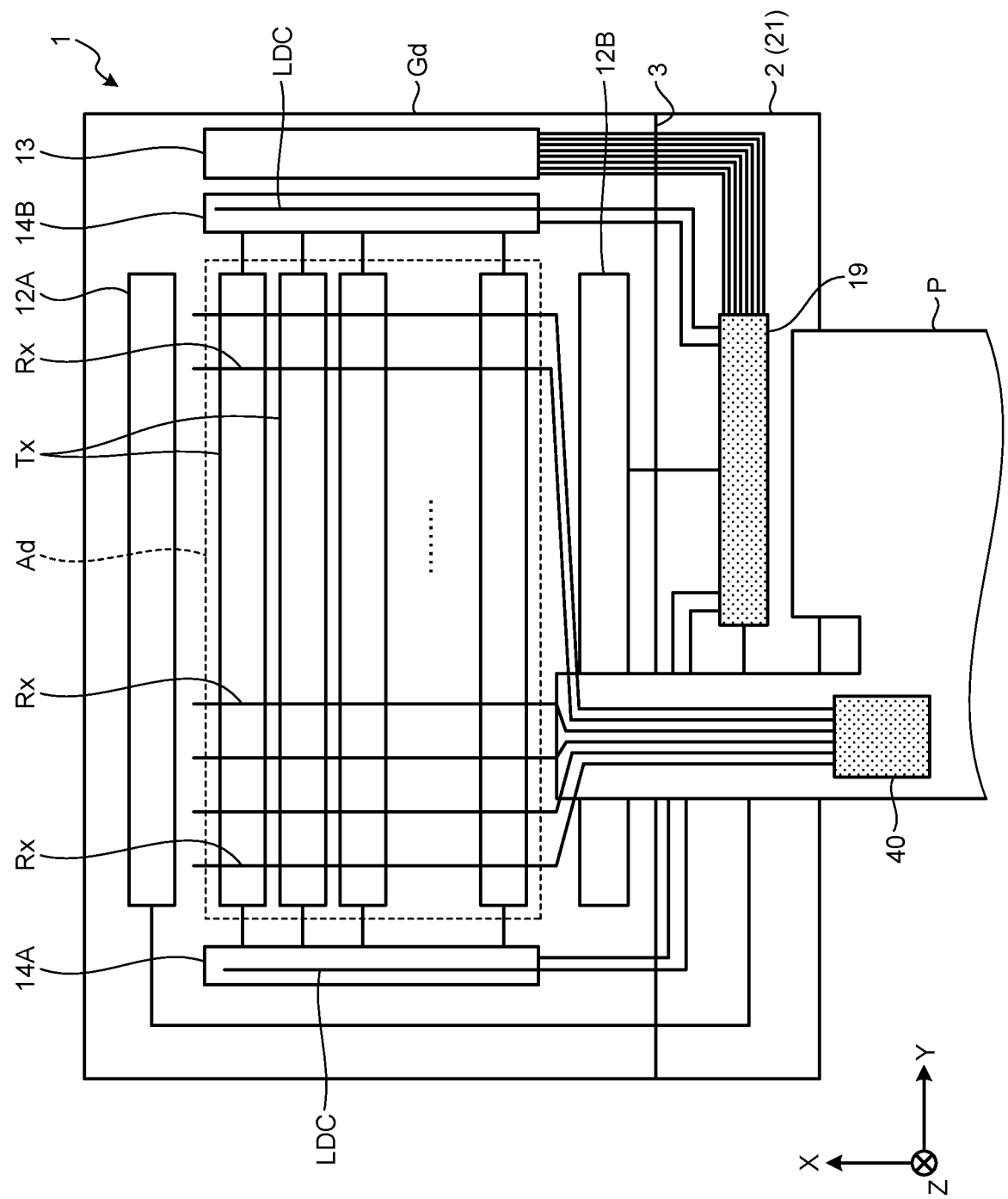
FIG. 2 is a diagram of an example of a module provided with the display device according to the present embodiment.

FIG. 2 is a diagram of an example of a module provided with the display device according to the present embodiment. The display device 1 has a reference plane parallel to a main surface 21a of a substrate 21 included in the display device 1, for example. One direction extending in the reference plane is referred to as an X-direction, and a direction orthogonal to the X-direction is referred to as a Y-direction. The Y-direction is not limited to the direction orthogonal to the X-direction and may be a direction intersecting therewith. A direction orthogonal to the X- and Y-directions is referred to as a Z-direction (refer to FIG. 3). In other words, the Z-direction is the normal direction to the main surface 21a of the substrate 21 (refer to FIG. 3), and planar view is a view of a plane seen from the Z-direction.

The display device 1 includes a pixel substrate 2 (substrate 21), which will be described later, and a wiring substrate P. The wiring substrate P is a flexible printed circuit board, for example. In planar view of the pixel substrate 2 (substrate 21), the pixel substrate 2 (substrate 21) is divided into a display region Ad and a peripheral region Gd of the display part 20. The pixel substrate 2 includes an IC chip 19. The IC chip 19 is a driver IC mounted on the substrate 21 and is a control device functioning as the control circuit 11 and incorporating circuits necessary for the display operation. The source driver 13 according to the present embodiment is formed on the substrate 21. The source driver 13 may be incorporated in the IC chip 19. The drive electrode driver 14 is formed on the substrate 21. The drive electrode driver 14 includes drive electrode scanners 14A and 14B. The gate driver 12 is formed on the substrate 21 as gate drivers 12A and 12B. The display device 1 may incorporate the circuits, such as the drive electrode scanners 14A and 14B and the gate driver 12, in the IC chip 19. While the IC chip 19 is mounted on the substrate 21, the present embodiment is not limited thereto. The IC chip 19 may be mounted on the wiring substrate P coupled to the substrate 21. In other words, the IC chip 19 may be configured as chip on glass (COG) formed on a glass substrate or as chip on film or chip on flexible (COF) formed on a film substrate.

As illustrated in FIG. 2, the drive electrodes Tx intersect the detection electrodes Rx in planar view of the substrate 21.

The drive electrodes Tx are arrayed in the X-direction and extend in the Y-direction in planar view. The drive electrode Tx has a strip shape. To perform the detection operation, the drive electrodes Tx are sequentially supplied with the drive signals VcomS from the drive electrode driver 14. The drive electrode Tx may have a slit overlapping at least one of a signal line SGL and the scanning line GCL. The drive electrode Tx may have a shape in which a plurality of strip electrodes extending in the Y-direction are coupled by a coupling electrode extending in the X-direction. The strip electrodes may be simultaneously supplied with the drive signals VcomS, thereby functioning as one drive electrode Tx.

The detection electrodes Rx are arrayed in the Y-direction and extend in the X-direction in planar view. The electrode extending direction (first direction) of the detection electrodes Rx according to the present embodiment is the X-direction, and a second direction intersecting the first direction is the Y-direction. The detection electrodes Rx are coupled to the detection circuit 40 mounted on the wiring substrate P via the wiring substrate P. The detection circuit 40 is mounted on the wiring substrate P and is coupled to each of the detection electrodes Rx provided in parallel with each other. The wiring substrate P is not limited to a flexible printed circuit board and may be a rigid or rigid flexible substrate. The detection circuit 40 is not necessarily mounted on the wiring substrate P and may be provided on a control substrate coupled via the wiring substrate P. While the detection circuit 40 according to the present embodiment is a detection driver IC mounted on the wiring substrate P, some of the functions of the detection circuit 40 may be provided as the functions of an MPU mounted on another control substrate. Specifically, the detection driver IC may include the amplification circuit and the A/D conversion circuit, for example, and the signal processing circuit and the coordinate extraction circuit may be implemented by a circuit, such as an MPU, provided separately from the detection driver IC. The detection circuit 40 may be incorporated in the IC chip 19 (one-chip configuration). In this case, the detection signals may be transmitted to the IC chip 19 on the array substrate via wiring of the wiring substrate P, for example.

The source driver 13 is formed in the peripheral region Gd on the substrate 21. In the display region Ad, a number of sub-pixels SPix, which will be described later, are disposed in a matrix (row-column configuration). The peripheral region Gd is a region outside the display region Ad and is a region not provided with the sub-pixels SPix on the substrate 21 in planar view. The gate driver 12 and the drive electrode driver 14 are disposed in the peripheral region Gd.

The gate driver 12 includes the gate drivers 12A and 12B, for example, and is configured by TFT elements on the substrate 21. The gate drivers 12A and 12B are disposed on both sides in the X-direction so as to sandwich the display region Ad in which the sub-pixels SPix (pixels), which will be described later, are disposed in a matrix (row-column configuration). The scanning lines GCL (refer to FIGS. 4 and 5) are arrayed between the gate drivers 12A and 12B. Therefore, the scanning lines GCL are provided extending in a direction parallel to the electrode extending direction (first direction) of the detection electrodes Rx. In the configuration according to the present embodiment, two circuits are provided as the gate drivers 12A and 12B. This is given by way of an example of a specific configuration of the gate driver 12, and the present embodiment is not limited thereto. The gate driver 12, for example, may be one circuit provided only at one end of the scanning lines GCL. In addition, the scanning lines GCL coupled to the gate drivers 12A and 12B may be the same or different lines.

The drive electrode driver 14 is configured by TFT elements on the substrate 21. The drive electrode driver 14 supplies the display drive signals VcomD to the common electrodes (drive electrodes Tx for detection) via display wiring LDC in a display period and supplies the detection drive signals VcomS to the common electrodes (drive electrodes Tx for detection) via detection wiring in a detection period. The drive electrode scanner 14A is coupled to one end of the drive electrodes Tx in the Y-direction, and the drive electrode scanner 14B is coupled to the other end of the drive electrodes Tx. The display wiring LDC that supplies the display drive signals VcomD is disposed in the peripheral region Gd. While two circuits of the drive electrode scanners 14A and 14B are provided as the drive electrode driver 14 according to the present embodiment, only one of them may be provided. The drive electrodes Tx coupled to the drive electrode scanners 14A and 14B may be the same or different electrodes.

Figure 3:
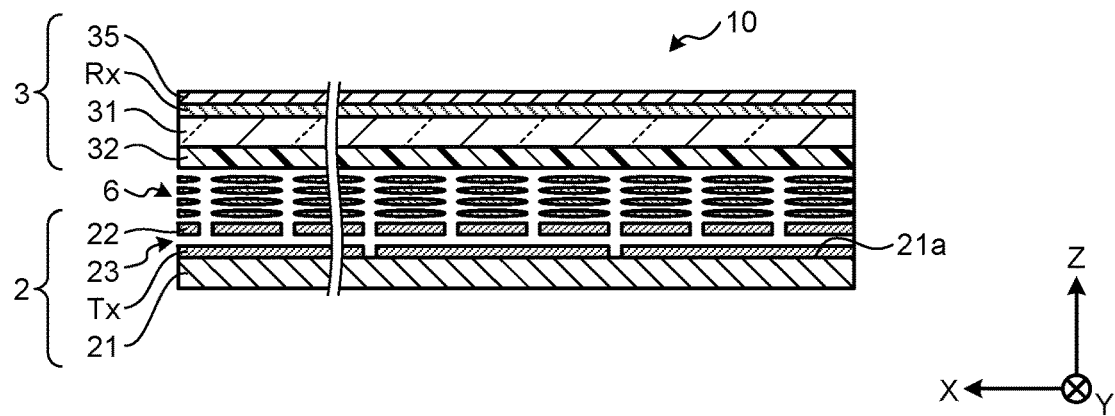
FIG. 3 is a sectional view of a schematic sectional structure of the display device according to the present embodiment.

The following describes an example of the configuration of the panel part 10 in greater detail. FIG. 3 is a sectional view of a schematic sectional structure of the display device according to the present embodiment. As illustrated in FIG. 3, the panel part 10 includes a pixel substrate 2, a counter substrate 3, and a display functional layer. The counter substrate 3 is disposed facing the pixel substrate 2 in the Z-direction. The display functional layer is disposed between the pixel substrate 2 and the counter substrate 3. The display functional layer is a liquid crystal layer 6, for example.

The pixel substrate 2 includes the substrate 21, a plurality of pixel electrodes 22, the drive electrodes Tx, and an insulating layer 23. The substrate 21 serves as a circuit board. The pixel electrodes 22 are arrayed in a matrix (row-column configuration) on the substrate 21. The drive electrodes Tx are formed between the substrate 21 and the pixel electrodes 22. The insulating layer 23 insulates the pixel electrodes 22 from the drive electrodes Tx. The substrate 21 includes a wiring layer between the pixel electrodes 22 and the substrate 21. The wiring layer is provided with thin film transistors (TFTs) constituting a pixel circuit that drives the sub-pixels Spix in the display region Ad and peripheral circuits (e.g., the drive electrode driver 14) formed in the peripheral region Gd. A polarizing plate (not illustrated) may be provided under the substrate 21 with an adhesive layer interposed therebetween.

While the drive electrodes Tx, the insulating layer 23, and the pixel electrodes 22 are stacked in this order on the substrate 21 according to the present embodiment, the embodiment is not limited thereto. The pixel electrodes 22, the insulating layer 23, and the drive electrodes Tx may be stacked in this order on the substrate 21. Alternatively, the pixel electrodes 22 and the drive electrodes Tx may be formed in the same layer with an insulating layer interposed therebetween. Still alternatively, at least one of the pixel electrodes 22 and the drive electrodes Tx may be disposed on a substrate 31.

The counter substrate 3 includes the substrate 31 and a color filter 32. The substrate 31 is made of insulating material. The color filter 32 is formed on a facing surface of the substrate 31 facing the substrate 21. The detection electrodes Rx are disposed on the surface opposite to the facing surface of the substrate 31 facing the substrate 21. The detection electrodes Rx are disposed apart from each other in the Y-direction (refer to FIGS. 2 and 6). A non-detection region CP is formed between the detection electrodes Rx (refer to FIG. 6). The non-detection region CP is provided with dummy electrodes 120, which will be described later (refer to FIG. 6). As illustrated in FIG. 3, a polarizing plate 35 is provided on the detection electrodes Rx and the dummy electrodes 120 (not illustrated in FIG. 3) with an adhesive layer interposed therebetween. The color filter 32 may be disposed on the substrate 21. The substrate 21 and the substrate 31 are glass substrates, for example. At least one of the substrates 21 and 31 is not limited to a glass substrate and may be a film substrate made of organic material, such as polyimide.

The liquid crystal layer 6 serving as the display functional layer is provided between the substrate 21 and the substrate 31. The liquid crystal layer 6 modulates light passing therethrough according to the state of an electric field. The liquid crystal layer 6, for example, may be made of liquid crystal for a lateral electric field mode, such as in-plane switching (IPS) including fringe field switching (FFS). Orientation films may be provided between the liquid crystal layer 6 and the pixel substrate 2 and between the liquid crystal layer 6 and the counter substrate 3 illustrated in FIG. 3. The liquid crystal layer 6 may be made of liquid crystal for a vertical electric field.

An illuminator, which is not illustrated, is provided under the substrate 21. The illuminator includes a light source, such as light-emitting diodes (LEDs), and outputs light from the light source toward the substrate 21. The light output from the illuminator passes through the pixel substrate 2. The display device 1 switches the part from which the light is blocked and not output and the part from which the light is output according to the state of the liquid crystal at each position, thereby displaying an image on the display surface. If the display part 20 is a reflective liquid crystal display panel, for example, the pixel electrodes 22 are made of reflective material that reflects light incident from the substrate 31, the drive electrodes Tx made of translucent conductive material are provided on the side closer to the counter substrate 3, and the illuminator need not be provided under the substrate 21. If the display part 20 is a reflective liquid crystal display panel, an illuminator (front light) that outputs light toward the substrate 21 may be provided on the substrate 31. If the display part 20 is a light-emitting display panel including light-emitting elements as the display elements, the display functional layer serves as a light-emitting layer and is disposed between anode electrodes and cathode electrodes corresponding to the pixel electrodes 22 and the drive electrodes Tx, for example. The light-emitting display panel need not be provided with the illuminator because it displays an image by controlling the amount of light from self-emitting bodies. If the light-emitting elements output different colors, the color filter 32 need not be provided.

Figure 4:
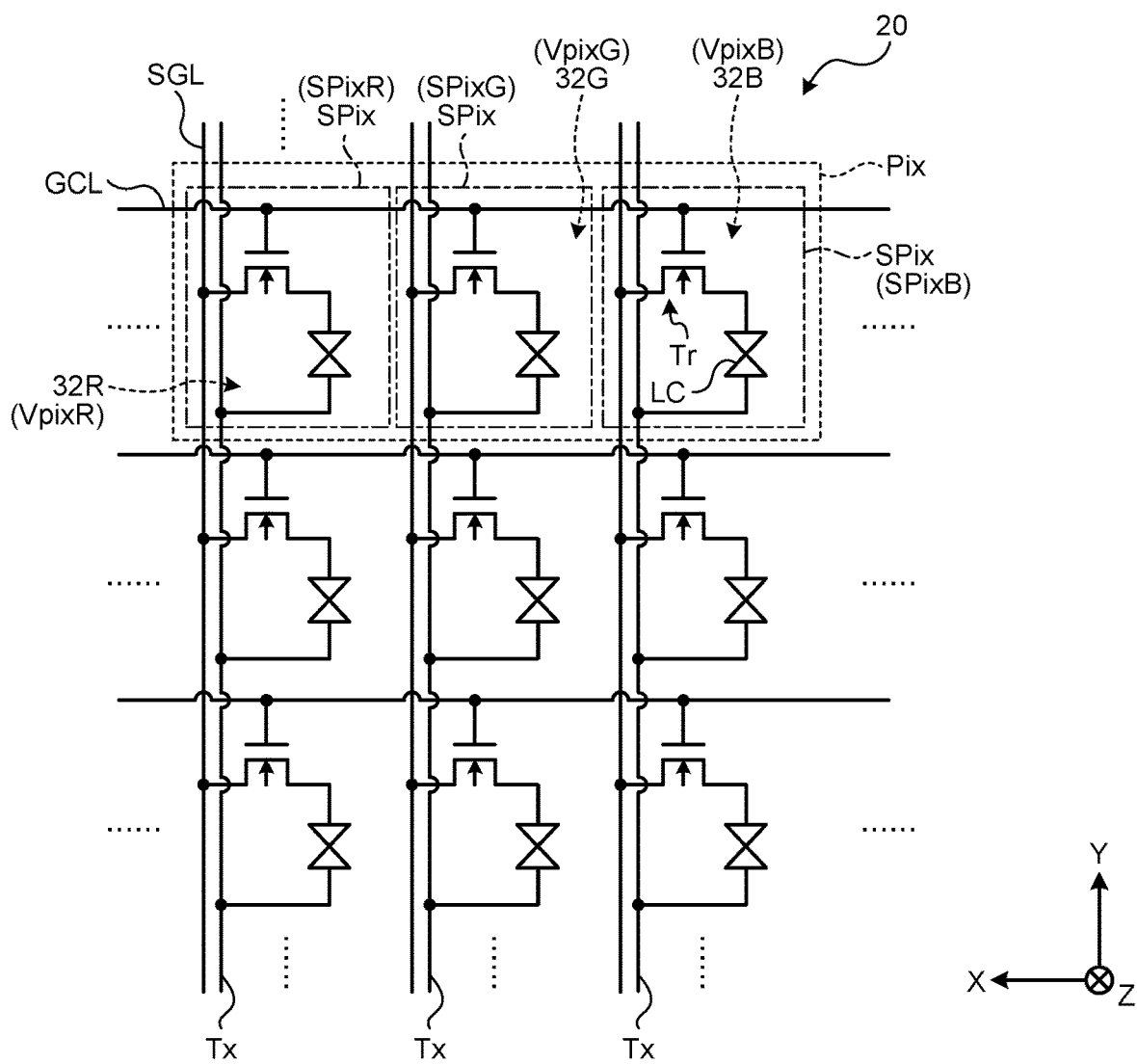
FIG. 4 is a circuit diagram of a pixel array of a display part according to the present embodiment.

FIG. 4 is a circuit diagram of a pixel array of the display part according to the present embodiment. The substrate 21 illustrated in FIG. 3 is provided with switching elements Tr and wiring, such as the signal lines SGL and the gate lines GCL illustrated in FIG. 4. Each of the switching elements Tr constitutes the pixel circuit of each sub-pixel Spix. The signal line SGL supplies the pixel signals Vpix to the pixel electrodes 22. The scanning line GCL drives the switching elements Tr. The signal lines SGL and the scanning lines GCL are formed in the wiring layer and extend on a plane parallel to the surface of the substrate 21. More specifically, the signal lines SGL extend in the Y-direction, and the scanning lines GCL extend in the X-direction. While the display circuit for driving each sub-pixel SPix is configured by one switching element Tr in the configuration according to the present embodiment, the embodiment is not limited thereto. The display circuit may be configured by a plurality of the switching elements Tr, or some pieces of wiring may be shared by a plurality of the sub-pixels SPix.

The display part 20 illustrated in FIG. 4 includes the sub-pixels SPix arrayed in a matrix (row-column configuration). Each of the sub-pixels SPix includes the switching element Tr serving as the display circuit and a liquid crystal element LC serving as the display element. The switching element Tr is configured by a thin film transistor and is configured by an n-channel metal oxide semiconductor (MOS)-type TFT in this example. One of the source and the drain of the switching element Tr is coupled to the signal line SGL. The gate of the switching element Tr is coupled to the scanning line GCL. The other of the source and the drain of the switching element Tr is coupled to a first end of the liquid crystal element LC. The first end of the liquid crystal element LC is coupled to the other of the source and the drain of the switching element Tr, and a second end thereof is coupled to the drive electrode Tx.

The sub-pixel SPix is coupled to the other sub-pixels Spix belonging to the same row in the display part 20 by the scanning line GCL. The scanning lines GCL are coupled to the gate driver 12 and are supplied with the scanning signals Vscan from the gate driver 12. The sub-pixel SPix is coupled to the other sub-pixels Spix belonging to the same column in the display part 20 by the signal line SGL. The signal lines SGL are coupled to the source driver 13 and are supplied with the pixel signals Vpix from the source driver 13. The drive electrode Tx is disposed facing at least the pixel electrodes 22 arrayed in the Y-direction. In other words, the sub-pixels SPix arrayed in the Y-direction share one drive electrode Tx in the display operation. The drive electrodes Tx are coupled to the drive electrode driver 14 and are supplied with the drive signals Vcom from the drive electrode driver 14. Specifically, the sub-pixels SPix facing one drive electrode Tx are supplied with the display drive signals VcomD at the same timing in the display operation, and the drive electrodes Tx are sequentially supplied with the detection drive signals VcomS in the detection operation. The sub-pixels Spix according to the present embodiment include sub-pixels SPixR sub-pixels SPixG, and sub-pixels SPixB. The sub-pixels SPixR receive pixel signals VpixR corresponding to the first color (red). The sub-pixels SPixG receive pixel signals VpixG corresponding to the second color (green). The sub-pixels SPixB receive pixel signals VpixB corresponding to the third color (blue). The sub-pixels SPix may include sub-pixels SPix corresponding to four or more colors. The sub-pixels Spix, for example, may include sub-pixels that receive pixel signals corresponding to white.

The color filter 32, for example, has color regions 32R, 32G, and 32B colored in three colors of the first color (red), the second color (green), and the third color (blue), respectively. The color regions 32R, 32G, and 32B are disposed corresponding to the sub-pixels SPixR, SPixG, and SPixB, respectively, illustrated in FIG. 4. In other words, one of the color regions 32R, 32G, and 32B is disposed in the vertical direction (Z-direction) with respect to each sub-pixel SPix.

Figure 5:
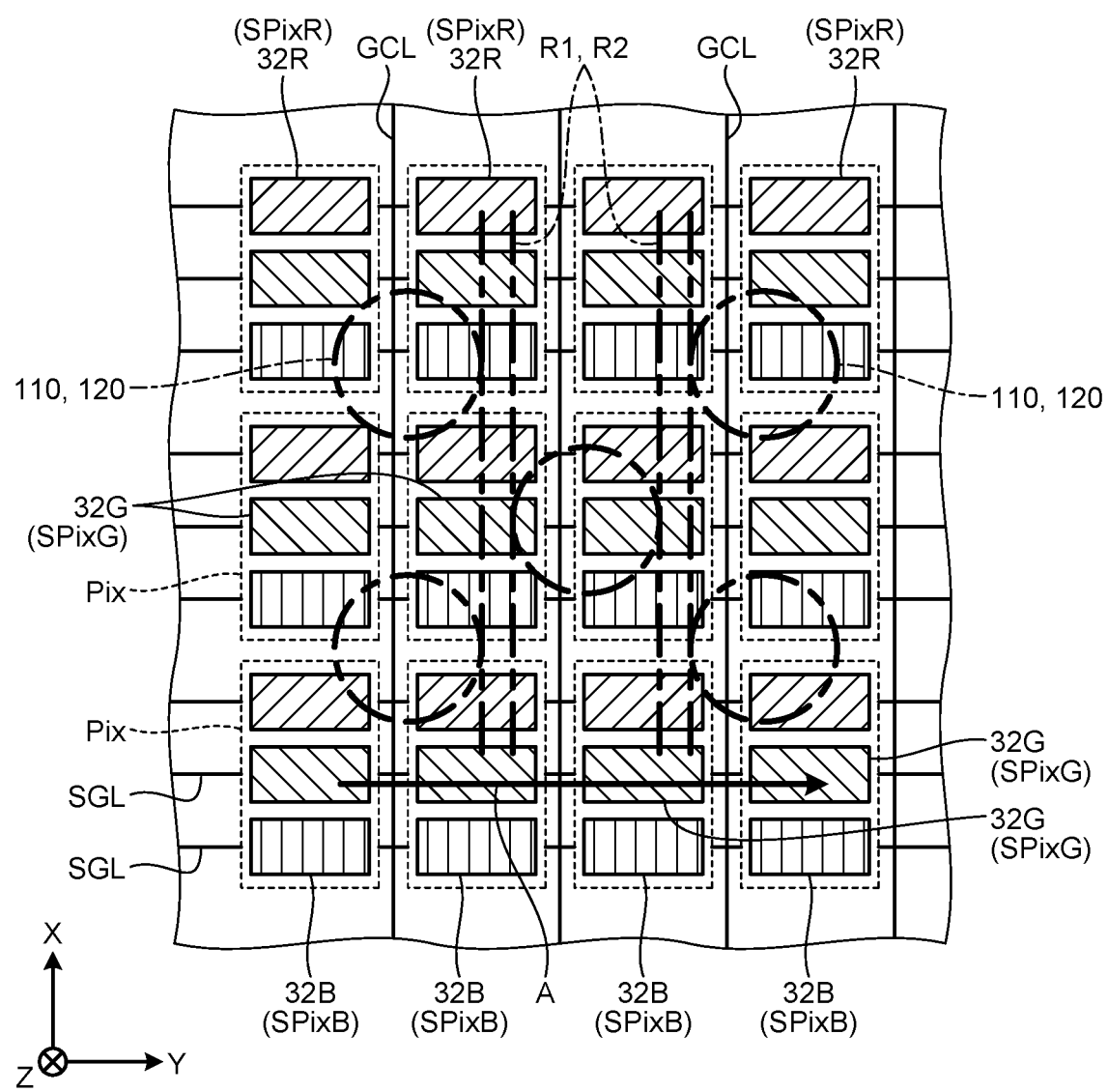
FIG. 5 is a schematic of the relation between sub-pixels and detection electrodes.

FIG. 5 is a schematic of the relation between the sub-pixels and the detection electrodes. The sub-pixels SPixR (color region 32R) in FIG. 5 are hatched by oblique lines gradually extending upward from left to right. The sub-pixels SPixG (color region 32G) in FIG. 5 are hatched by oblique lines gradually extending upward from right to left. The sub-pixels SPixB (color region 32B) in FIG. 5 are hatched by straight lines extending vertically. As illustrated in FIG. 5, the sub-pixels Spix are periodically arrayed in order of the sub-pixel SPixR, the sub-pixel SPixG, and the sub-pixel SPixB in the X-direction. The sub-pixels SPix that receive the pixel signals Vpix corresponding to the same color are arrayed in the Y-direction. Specifically, the color region 32R of a first pixel Pix, for example, is disposed continuously with the color region 32R of a second pixel Pix in the Y-direction (second direction). The direction in which the sub-pixels SPix that receive the pixel signals Vpix corresponding to the same color are arrayed is referred to as a same color array direction A (refer to the arrow in FIG. 5). The same color array direction A is the Y-direction (second direction).

Figure 6:
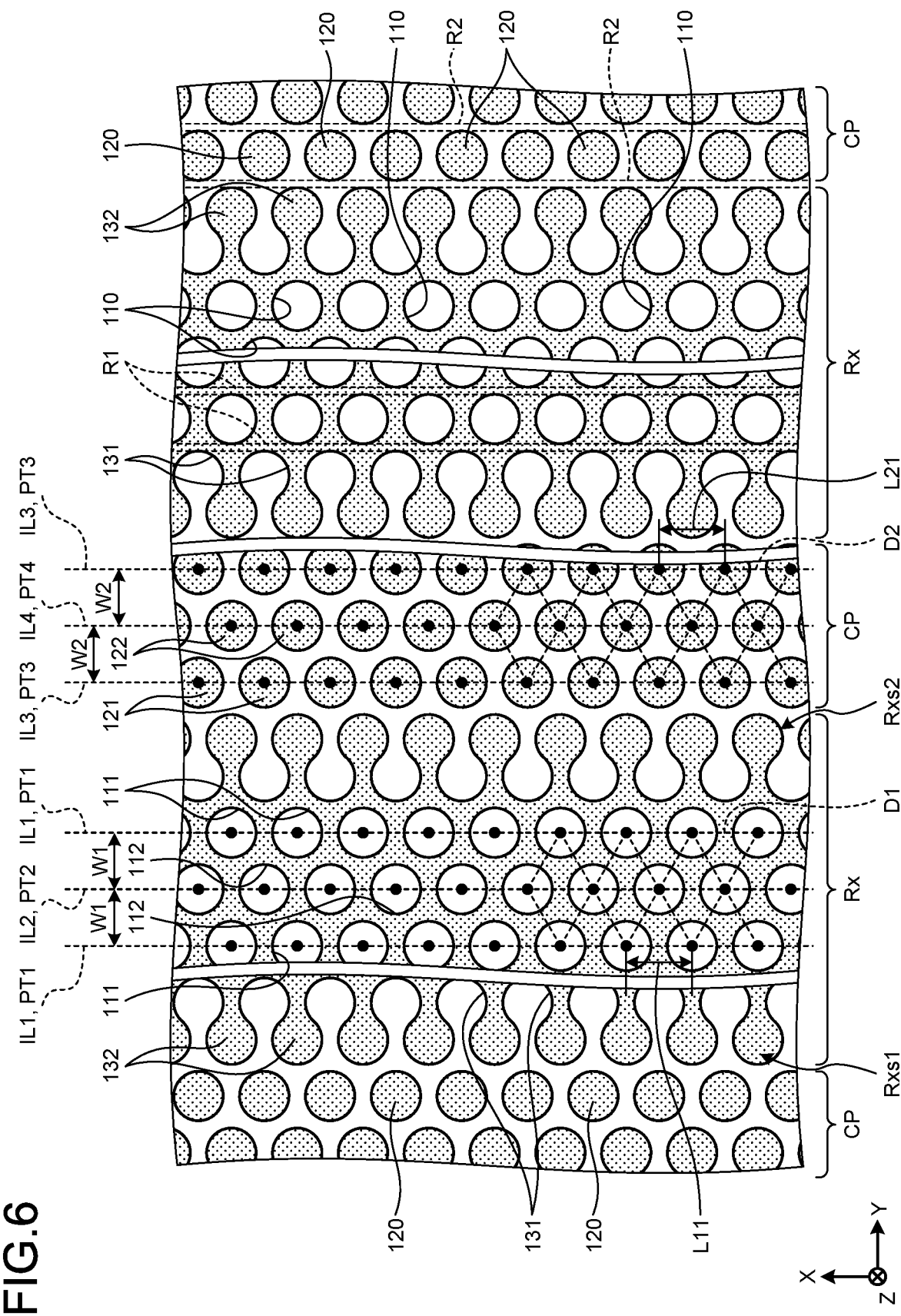
FIG. 6 is a schematic of the detection electrodes and a non-detection region in planar view.
Figure 7:
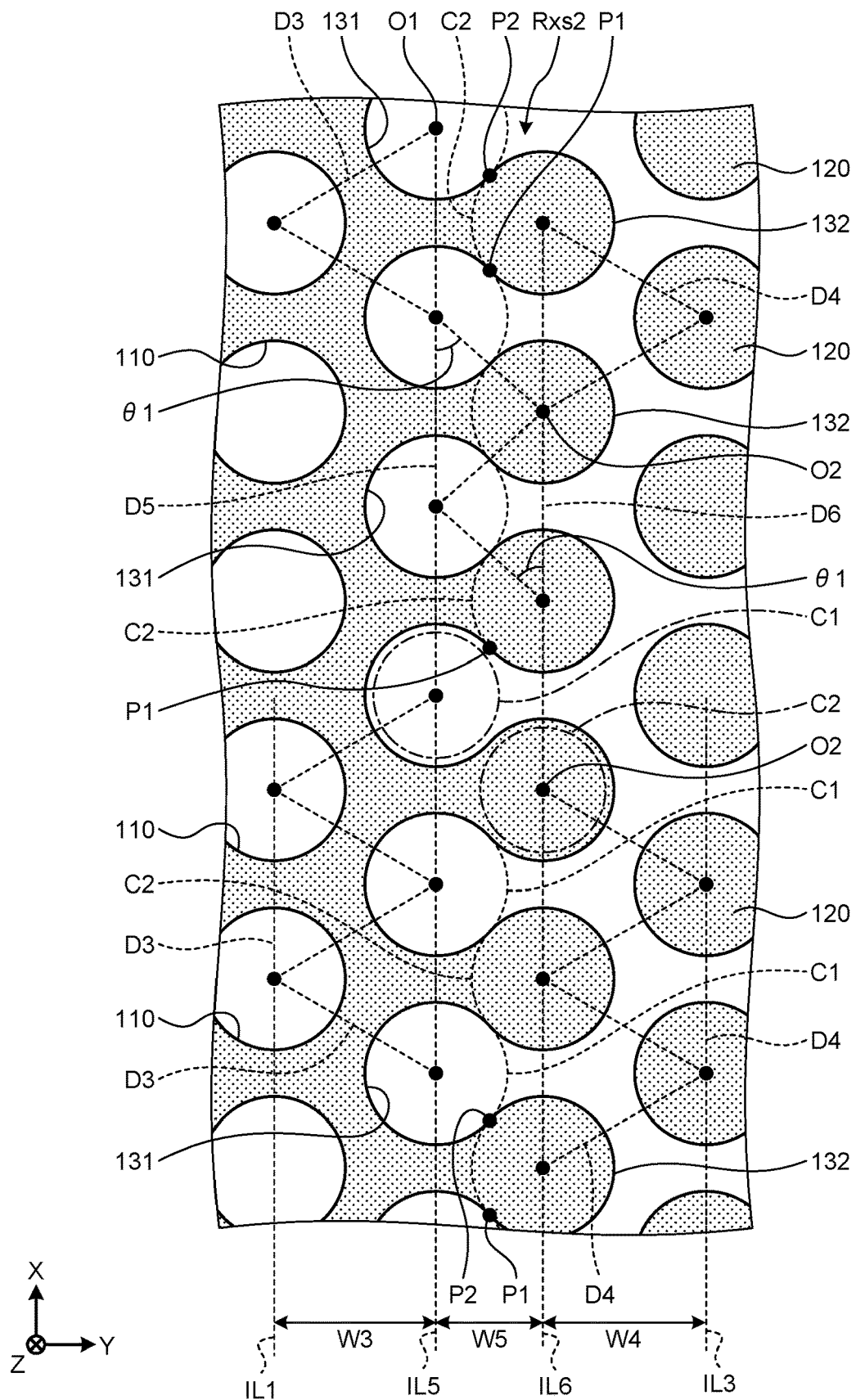
FIG. 7 is an enlarged view of a part around an end of the detection electrode illustrated in FIG. 6.

The following describes the detection electrodes Rx and the dummy electrodes 120. FIG. 6 is a schematic of the detection electrodes and the non-detection region in planar view. FIG. 7 is an enlarged view of a part around an end of the detection electrode illustrated in FIG. 6. In FIGS. 6 and 7, formation regions in which conductive material is formed are shaded with dots. Regions in which no conductive material is formed are not shaded with dots.

As illustrated in FIG. 6, the detection electrodes Rx extend in the X-direction (first direction). The detection electrodes Rx are disposed apart from each other in the Y-direction (second direction). The detection electrode Rx is made of translucent conductive material, such as indium tin oxide (ITO). The detection electrode Rx is not necessarily made of ITO and may be made of other metals or metal oxides. Ends Rxs1 and Rxs2 extending in the X-direction are formed at the ends of the detection electrode Rx in the Y-direction. The detection electrode Rx has a plurality of openings 110 in planar view. The opening 110 according to the present embodiment is a region not provided with the conductive material constituting the detection electrode Rx in planar view, and more specifically is a region surrounded by the conductive material constituting one detection electrode Rx. The opening 110 has a circular shape.

The dummy electrodes 120 are provided in the non-detection region CP. The dummy electrode 120 has a circular shape in planar view. The dummy electrode 120 is not coupled to a detection circuit DET. The dummy electrode 120 is made of translucent conductive material, such as ITO, which is the same conductive material as that of the detection electrode Rx.

The opening 110 of the detection electrode Rx and the dummy electrode 120 have substantially the same shape. Forming the opening 110 and the dummy electrode 120 in a circular shape suppresses a change in the reflectance of external light if the relative angle between a user and the device is different. The shape of the opening 110 and the dummy electrode 120 according to the present embodiment is not strictly limited to a circular arc. The shape may be a circular arc formed by a polygon composed of a plurality of connected straight lines or may be an ellipse or other shapes. The opening 110 of the detection electrode Rx and the dummy electrode 120 have substantially the same size. The openings 110 of the detection electrodes Rx and the dummy electrodes 120 are arrayed with regularity. The following describes the regularity with reference to FIG. 6.

In FIG. 6, the openings 110 of the detection electrode Rx constitute a first array PT1 and a second array PT2. A plurality of the first arrays PT1 and the second arrays PT2 are provided. The first arrays PT1 and the second arrays PT2 are alternately arrayed in the Y-direction. Openings 111 of the detection electrode Rx refer to openings constituting the first array PT1 out of the openings 110. Openings 112 refer to openings constituting the second array PT2 out of the openings 110.

As illustrated in FIG. 6, the first array PT1 includes the openings 111 periodically arrayed in the X-direction. The second array PT2 includes the openings 112 periodically arrayed in the X-direction. In the first array PT1, the distance between the centers of the openings 111 adjacent to each other in the X-direction is a length L11. Also in the second array PT2, the distance between the centers of the openings 112 adjacent to each other in the X-direction is the length L11. In other words, the openings 110 in the first array PT1 and the second array PT2 are formed at substantially equal intervals in the X-direction.

The openings 111 belonging to the first array PT1 are shifted in the X-direction with respect to the openings 112 belonging to the second array PT2. In other words, the opening 112 is formed between two adjacent openings 111 in the X-direction. Therefore, the openings 110 are arrayed in a triangular grid.

If a virtual triangle D1 is formed by connecting the centers of the three adjacent openings 110 with virtual lines, the virtual triangle D1 is an equilateral triangle. Thus, the openings 110 are arrayed in an equilateral triangular grid. A virtual line IL1 is a line connecting the centers of the openings 111 belonging to the first array PT1. A virtual line IL2 is a line connecting the centers of the openings 112 belonging to the second array PT2.

The dummy electrodes 120 constitute a third array PT3 and a fourth array PT4. A plurality of the third arrays PT3 and the fourth arrays PT4 are provided. The third arrays PT3 and the fourth arrays PT4 are alternately arrayed in the Y-direction. Dummy electrodes 121 are electrodes constituting the third array PT3 out of the dummy electrodes 120. Dummy electrodes 122 are electrodes constituting the fourth array PT4 out of the dummy electrodes 120.

The third array PT3 includes the dummy electrodes 121 periodically arrayed in the X-direction. The fourth array PT4 includes the dummy electrodes 122 periodically arrayed in the X-direction. In the third array PT3, the distance between the centers of the dummy electrodes 121 adjacent to each other in the X-direction is a length L21. In the fourth array PT4, the distance between the centers of the dummy electrodes 122 adjacent to each other in the X-direction is the length L21. In other words, the dummy electrodes 120 in the third array PT3 and the fourth array PT4 are disposed at substantially equal intervals.

The dummy electrodes 121 belonging to the third array PT3 are shifted in the X-direction with respect to the dummy electrodes 122 belonging to the fourth array PT4. In other words, the dummy electrode 122 is disposed between two adjacent dummy electrodes 121 in the X-direction. Therefore, the dummy electrodes 120 are arrayed in a triangular grid.

If a virtual triangle D2 is formed by connecting the centers of the three adjacent dummy electrodes 120 with virtual lines, the virtual triangle D2 is an equilateral triangle. Thus, the dummy electrodes 120 are arrayed in an equilateral triangular grid. A virtual line IL3 illustrated in FIG. 6 is a line connecting the centers of the dummy electrodes 121 belonging to the third array PT3. A virtual line IL4 is a line connecting the centers of the dummy electrodes 122 belonging to the fourth array PT4. The virtual lines IL1, IL2, IL3, and IL4 according to the present embodiment are straight lines extending in the X-direction. The distance between the virtual lines IL1 and IL2 in the Y-direction is a width W1, and the distance between the virtual lines IL3 and IL4 in the Y-direction is a width W2. In other words, the height of the virtual triangle D1 is the width W1 and the height of the virtual triangle D2 is the width W2. The widths W1 and W2 according to the present embodiment are substantially equal.

The lengths L11 and L21 described above are the same length. Therefore, the openings 110 and the dummy electrodes 120 are disposed at equal intervals in the X-direction. The virtual triangles D1 and D2 have the same size because the lengths L11 and L21 are the same length. As described above, the opening 110 of the detection electrode Rx and the dummy electrode 120 have the same diameter. If the diameter of the opening 110 and the dummy electrode 120 is too large, the occupancy ratio of the conductive material decreases in the virtual triangle D1 and increases in the virtual triangle D2. By contrast, if the diameter of the opening 110 and the dummy electrode 120 is too small, the occupancy ratio of the conductive material increases in the virtual triangle D1 and decreases in the virtual triangle D2. If there are variations in the occupancy ratio of the conductive material in the plane including the detection electrodes Rx and the non-detection region CP, the reflectance to incident light is not uniform, thereby deteriorating an image quality displayed on the display surface. The diameter of the opening 110 and the dummy electrode 120 according to the present embodiment is adjusted such that the occupancy ratio of the conductive material is approximately 50% in the virtual triangles D1 and D2. In other words, the occupancy ratios of the conductive material are substantially equal in the center part of the detection electrode Rx where the virtual triangles D1 are formed and the non-detection region CP where the virtual triangles D2 are formed.

With the configuration described above, the detection electrode Rx and the non-detection region CP also have continuous regions R1 and continuous regions R2, respectively, linearly extending in the X-direction and provided with no opening 110 or no dummy electrode 120 as illustrated in FIG. 6.

As illustrated in FIG. 5, the continuous regions R1 and R2 intersect the same color array direction A of the sub-pixels SPix. In other words, the continuous regions R1 and R2 overlap all the color regions 32R, 32G, and 32B of the color filter 32. Therefore, moiré (interference fringes) hardly occurs.

If the extending direction of the continuous regions R1 and R2 and the same color array direction A of the sub-pixels SPix are the same direction, the continuous regions R1 and R2 continue to overlap one of the sub-pixels SPixR, SPixG and SPixB. In other words, the continuous regions R1 and R2 continue to overlap one of the color regions 32R, 32G, and 32B. As a result, light in the color with which the continuous regions R1 and R2 overlap and light in the other two colors do not have the same intensity. Therefore, there are variations in the intensities of light transmitted through the three color regions 32R, 32G, and 32B, thereby causing moiré.

The following describes the ends Rxs1 and Rxs2 of the detection electrode Rx. As illustrated in FIG. 6, the ends Rxs1 and Rxs2 of the detection electrode Rx each have recesses 131 and protrusions 132. The recess 131 has a circular arc shape recessed toward the inside of the detection electrode Rx in the Y-direction. The protrusion 132 has a circular arc shape protruding toward the outside of the detection electrode Rx in the Y-direction. The recesses 131 and the protrusions 132 are alternately and continuously formed in the X-direction (first direction). As a result, the ends Rxs1 and Rxs2 of the detection electrode Rx have a wave shape that alternately rises and falls from one side to the other in the Y-direction. The shape of the recess 131 and the protrusion 132 is not strictly limited to a circular arc. The shape may be a circular arc formed by a polygon composed of a plurality of connected straight lines or may be an ellipse or other shapes.

As illustrated in FIG. 7, the recesses 131 are formed along first virtual circles C1 periodically arrayed in the X-direction. In other words, the recess 131 overlaps part of the first virtual circle C1. In FIG. 7, one of the first virtual circles C1 is reduced in diameter and is drawn on the inner side of the inner circumference of the recess 131 because the first virtual circles C1 overlap the respective recesses 131 and are hard to see.

The first virtual circle C1 is a circle having the same diameter as that of the opening 110 and the dummy electrode 120. In other words, the recess 131 also has the same diameter as that of the opening 110 and the dummy electrode 120. If a virtual triangle D3 is formed by connecting centers O1 of two first virtual circles C1 adjacent to each other in the X-direction and the center of the opening 110 adjacent to the first virtual circles C1, the virtual triangle D3 is an equilateral triangle. If the virtual triangle D3 is formed by connecting the centers of two openings 110 adjacent to each other in the X-direction and the center O1 of one first virtual circle C1, the virtual triangle D3 is also an equilateral triangle. Thus, the first virtual circles C1 and the openings 110 are arrayed in an equilateral triangular grid. In the region surrounded by the virtual triangle D3, the occupancy ratio of the conductive material is approximately 50%.

The protrusions 132 are formed along second virtual circles C2 periodically arrayed in the X-direction. In other words, the protrusion 132 overlaps part of the second virtual circle C2. In FIG. 7, one of the second virtual circles C2 is reduced in diameter and is drawn on the inner side of the inner circumference of the protrusion 132 because the second virtual circles C2 overlap the respective protrusions 132 and are hard to see.

The second virtual circle C2 is a circle having the same diameter as that of the opening 110 and the dummy electrode 120. Therefore, the protrusion 132 also has the same diameter as that of the opening 110 and the dummy electrode 120. If a virtual triangle D4 is formed by connecting centers O2 of two second virtual circles C2 adjacent to each other in the X-direction and the center of the dummy electrode 120 adjacent to the second virtual circles C2, the virtual triangle D4 is an equilateral triangle. If the virtual triangle D4 is formed by connecting the centers of two dummy electrodes 120 adjacent to each other in the X-direction and the center O2 of one second virtual circle C2, the virtual triangle D4 is also an equilateral triangle. Thus, the second virtual circles C2 and the dummy electrodes 120 are arrayed in an equilateral triangular grid. In the region surrounded by the virtual triangle D4, the occupancy ratio of the conductive material is approximately 50%.

The first virtual circles C1 are formed apart from each other in the X-direction. The second virtual circles C2 are formed between the first virtual circles C1 in the X-direction. In other words, the first virtual circles C1 and the second virtual circles C2 are alternately arrayed in the X-direction. The second virtual circle C2 is tangent to the two first virtual circles C1 adjacent to each other in the X-direction and has points of tangency P1 and P2.

The recess 131 and the protrusion 132 extend between the points of tangency P1 and P2 on the first virtual circle C1 and the second virtual circle C2. In other words, the end of the recess 131 and the end of the protrusion 132 are coupled on the points of tangency P1 and P2. Thus, the ends Rxs1 and Rxs2 of the detection electrode Rx according to the embodiment have the recesses 131 and the protrusions 132 alternately formed in the X-direction and have no straight line part extending linearly. Therefore, light incident on the ends Rxs1 and Rxs2 are refracted at various angles. As a result, the ends Rxs1 and Rxs2 of the detection electrode Rx according to the embodiment make linear reflected light hard to visually recognize.

A virtual triangle D5 in FIG. 7 is a virtual triangle formed by connecting the centers O1 of two first virtual circles C1 and the center O2 of the second virtual circle C2. A virtual triangle D6 in FIG. 7 is a virtual triangle formed by connecting the center O1 of the first virtual circle C1 and the centers O2 of two second virtual circles C2. The line segment connecting the centers O1 of the first virtual circles C1 arrayed in the X-direction is referred to as a virtual line IL5, and the line segment connecting the centers O2 of the second virtual circles C2 arrayed in the X-direction is referred to as a virtual line IL6. The distance between the virtual lines IL5 and IL1 in the Y-direction is a width W3. The distance between the virtual lines IL6 and IL3 in the Y-direction is a width W4. The widths W3 and W4 are substantially equal and are substantially equal to at least one of the widths W1 and W2. The distance between the virtual lines IL5 and IL6 in the Y-direction is a width W5. The width W5 is smaller than at least one of the widths W3 and W4. In the configuration according to the present embodiment, the widths W1, W2, W3, and W4 are equal, and the width W5 is smaller than the widths W1, W2, W3, and W4.

As described above, the first virtual circle C1 and the second virtual circle C2 are tangent to each other. Thus, the distance between the first virtual circle C1 and the second virtual circle C2 in the Y-direction is shorter than the distance (width W1) between the openings 110 in the Y-direction and the distance (width W2) between the dummy electrodes 120 in the Y-direction. Therefore, the virtual triangles D5 and D6 have a shorter length in the Y-direction than that of at least one of the virtual triangles D3 and D4 and are isosceles triangles. An angle θ1 of the virtual triangles D5 and D6 according to the present embodiment is approximately 47.6 degrees. Therefore, the occupancy ratio of the conductive material in each of the virtual triangles D5 and D6 is not approximately 50% unlike the other virtual triangles. The shapes of the ends Rxs1 and Rxs2 in the virtual triangle D5 and the shapes of the ends Rxs1 and Rxs2 in the virtual triangle D6 are symmetric with respect to a line extending in the X-direction. Therefore, the occupancy ratio of the conductive material is approximately 50% in the region combining both of the virtual triangles D5 and D6, that is, the range sandwiched between the virtual lines IL5 and IL6 (range indicated by the arrow W5 in FIG. 7).

As described above, the first embodiment prevents reflected light reflected by the ends Rxs1 and Rxs2 of the detection electrodes Rx from being linear light. The detection electrodes Rx and the non-detection region CP are provided with the openings 110, the dummy electrodes 120, the recesses 131, and the protrusions 132 formed into a circular or circular arc shape. As a result, transmitted light passing through the counter substrate 3 (refer to FIG. 3) is refracted at various angles by the openings 110, the dummy electrodes 120, the recesses 131, and the protrusions 132. Therefore, the mesh shape formed by the drive electrodes Tx and the detection electrodes Rx is hard to visually recognize. In addition, the occupancy ratio of the conductive material is uniformized at approximately 50% in all the regions including the detection electrodes Rx and the non-detection region CP. Consequently, the reflectance to incident light is equalized, and an image quality displayed on the display surface is improved.

The continuous regions R formed in the detection electrodes Rx and the non-detection region CP are formed such that they overlap all the color regions 32R, 32G, and 32B of the color filter 32, making moiré (interference fringes) hard to occur.

The following describes modifications and other embodiments of the present disclosure. The modifications and other embodiments have the same configuration as that of the first embodiment, except for items of special note.

First Modification

Figure 8:
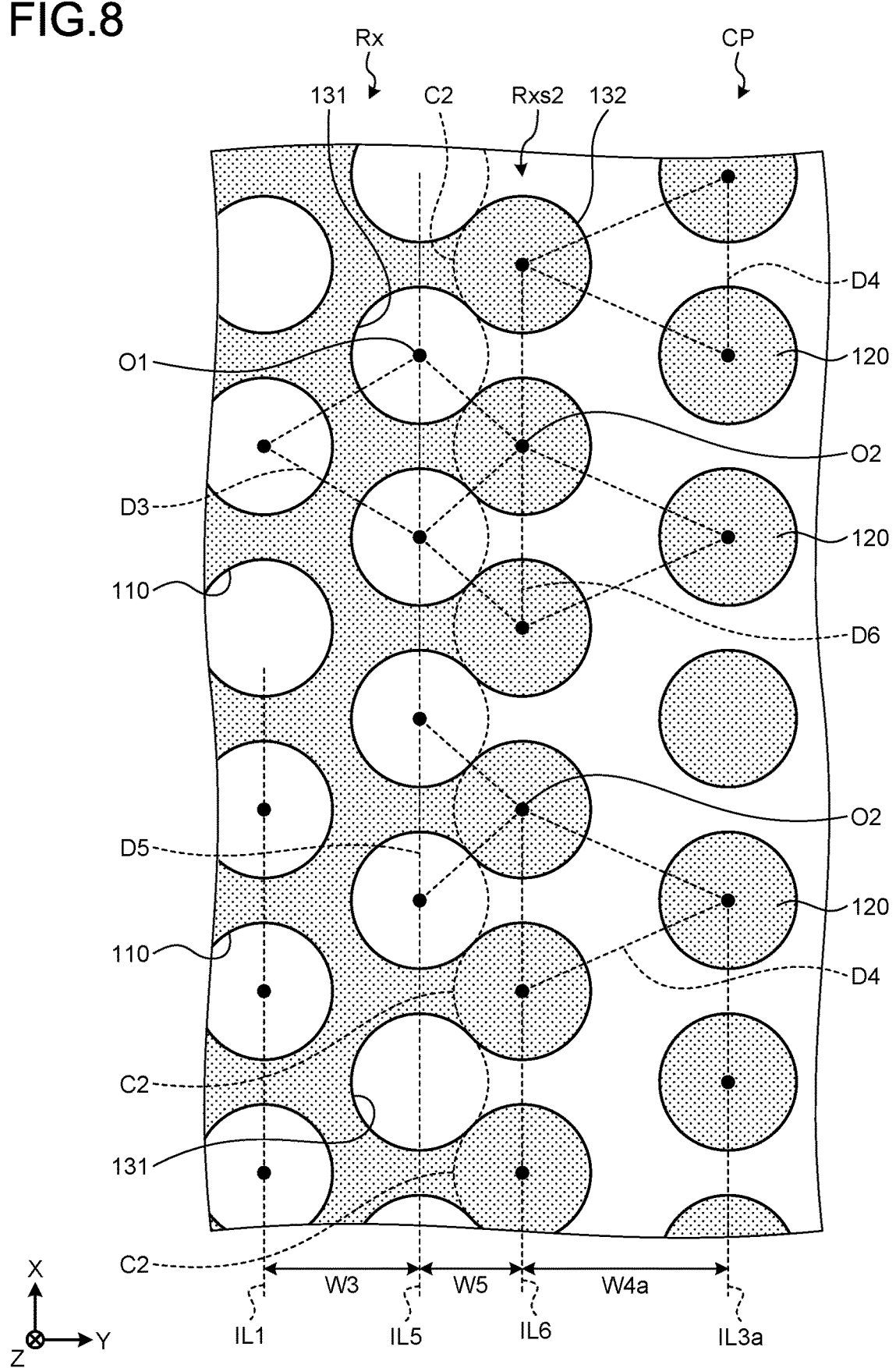
FIG. 8 is an enlarged view of a part around the end of the detection electrode according to a first modification.

FIG. 8 is an enlarged view of a part around the end of the detection electrode according to a first modification. The first modification changes the distance in the Y-direction between the virtual line IL6 connecting the centers of the protrusions 132 arrayed in the X-direction and a virtual line IL3a connecting the centers of the dummy electrodes 121 arrayed in the X-direction to a width W4a. The width W4a is larger than the width W4. In the first modification, if the virtual triangle D4 is formed by connecting the centers of the two second virtual circles C2 and the center of the dummy electrode 120, the virtual triangle D4 is not an equilateral triangle but an isosceles triangle. Consequently, the first modification can change the occupancy ratio of the conductive material in the region surrounded by the virtual triangle D4.

Second Modification

Figure 9:
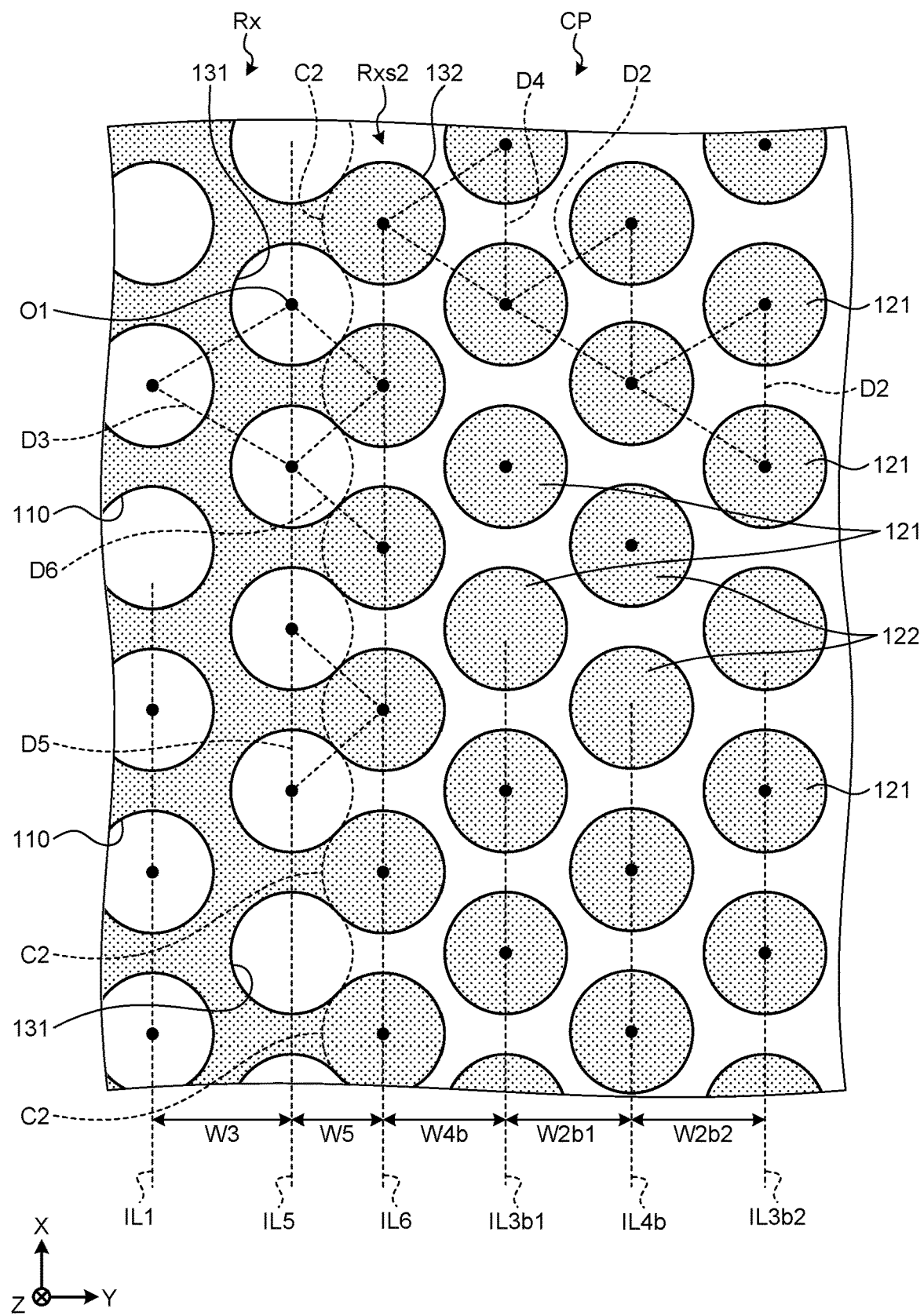
FIG. 9 is an enlarged view of a part around the end of the detection electrode according to a second modification.

FIG. 9 is an enlarged view of a part around the end of the detection electrode according to a second modification. The second modification changes the distance in the Y-direction between the virtual line IL6 connecting the centers of the protrusions 132 arrayed in the X-direction and a virtual line IL3b1 connecting the centers of the dummy electrodes 121 arrayed in the X-direction to a width W4b. The second modification also changes the distance in the Y-direction between the virtual line IL3b1 and a virtual line IL4b adjacent to the virtual line IL3b1 in the Y-direction and connecting the dummy electrodes 122 arrayed in the X-direction to a width W2b1. The second modification also changes the distance in the Y-direction between the virtual line IL4b and a virtual line IL3b2 adjacent to the virtual line IL4b in the Y-direction and connecting the dummy electrodes 121 arrayed in the X-direction to a width W2b2. The magnitudes of the width W5, the width W4b, the width W2b1, the width W2b2, and the width W3 satisfy W5<W4b<W2b1<W2b2≤W3. In other words, the width gradually changes such that the space between the virtual lines IL increases as it is farther away from the virtual line IL5 in the X-direction. With this configuration, the transmittance of the region sandwiched by the virtual lines IL gradually changes as it is farther away from the end Rxs2 of the detection electrode Rx, thereby making the occupancy ratio of the conductive material closer to approximately 50%.

Third Modification

Figure 10:
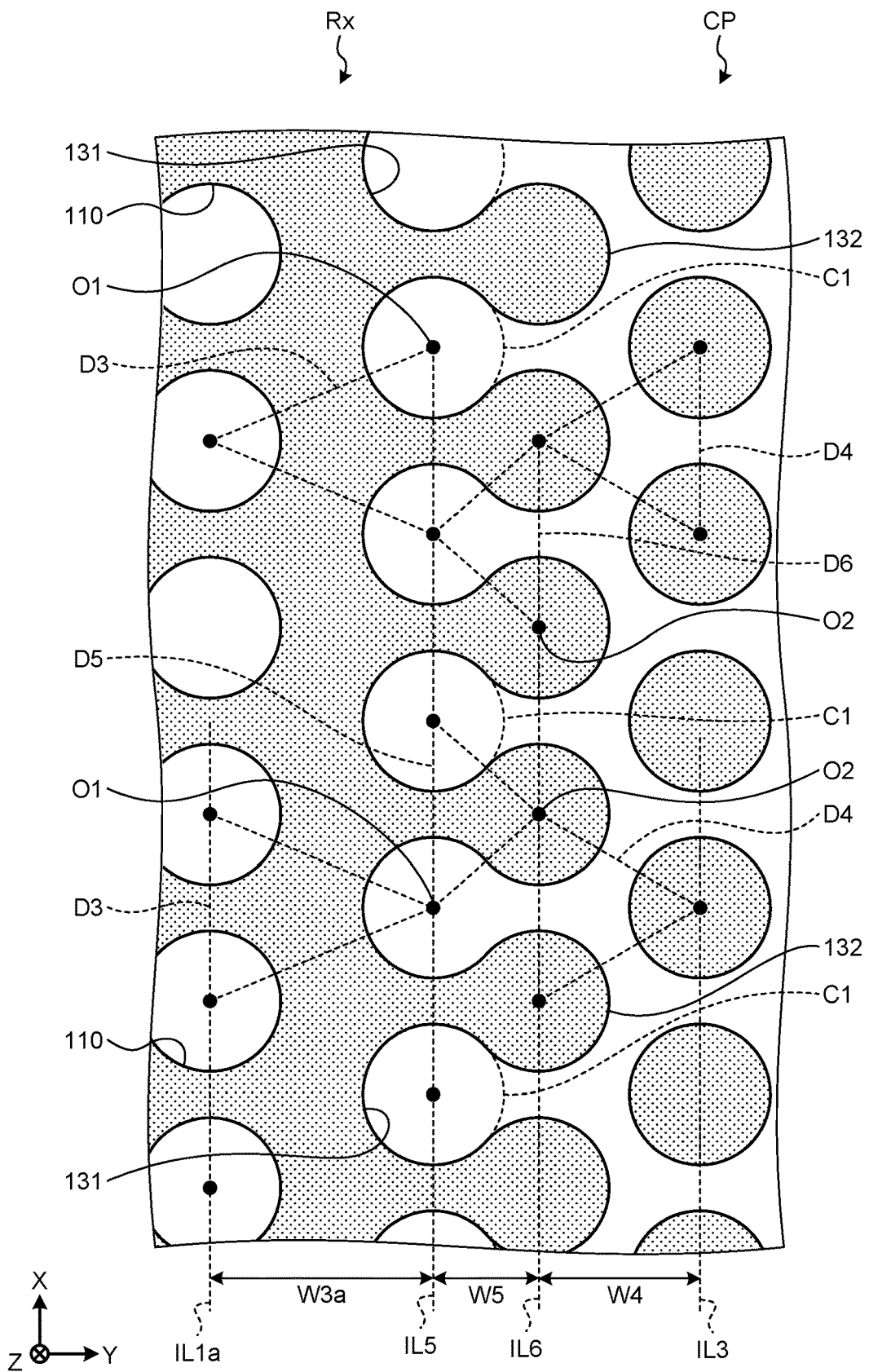
FIG. 10 is an enlarged view of a part around the end of the detection electrode according to a third modification.

FIG. 10 is an enlarged view of a part around the end of the detection electrode according to a third modification. The third modification changes the distance in the Y-direction between the virtual line IL5 connecting the recesses 131 arrayed in the X-direction and the virtual line IL1a connecting the openings 110 arrayed in the X-direction to a width W3a. The width W3a is larger than the width W3. If the virtual triangle D3 is formed by connecting the centers of the two first virtual circles C1 and the center of the opening 110, the virtual triangle D3 is not an equilateral triangle but an isosceles triangle. Consequently, the third modification can change the occupancy ratio of the conductive material in the region surrounded by the virtual triangle D3.

Fourth Modification

Figure 11:
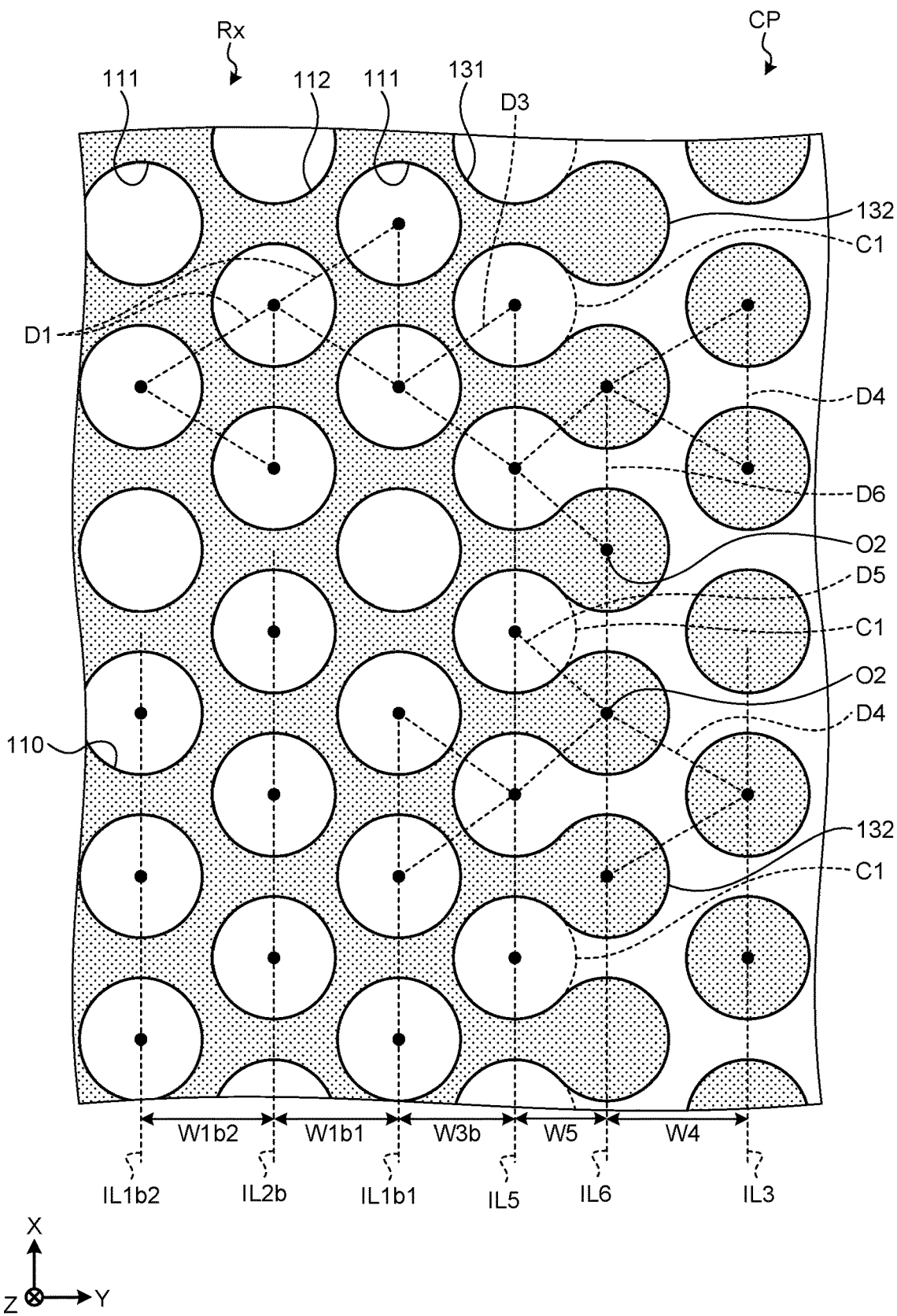
FIG. 11 is an enlarged view of a part around the end of the detection electrode according to a fourth modification.

FIG. 11 is an enlarged view of a part around the end of the detection electrode according to a fourth modification. The fourth modification changes the distance in the Y-direction between the virtual line IL5 connecting the centers of the recesses 131 arrayed in the X-direction and a virtual line IL1b1 connecting the centers of the openings 111 arrayed in the X-direction to a width W3b. The fourth modification also changes the distance in the Y-direction between the virtual line IL1b1 and a virtual line IL2b adjacent to the virtual line IL1b1 in the Y-direction and connecting the centers of the openings 112 arrayed in the X-direction to a width W1b1. The fourth modification also changes the distance in the Y-direction between the virtual line IL2b and a virtual line IL1b2 adjacent to the virtual line IL2b in the Y-direction and connecting the openings 111 arrayed in the X-direction to a width W1b2. The width W5, the width W4, the width W3b, the width W1b1, and the width W1b2 satisfy W5<W3b<W1b1<W1b2≤W4. In other words, the width may gradually increase such that the space between the virtual lines IL increases as it is farther away from the virtual line IL6 in the X-direction. This configuration can reduce a change in transmittance in the region sandwiched by the virtual lines IL. While the width according to the present embodiment changes in four stages of the width W5, the width W3b, the width W1b1, the width W1b2, and the width W4, the embodiment is not limited thereto. The width may change in four or less stages only by the width W5 and the width W3b or may increase in five or more stages.

Fifth Modification

Figure 12:
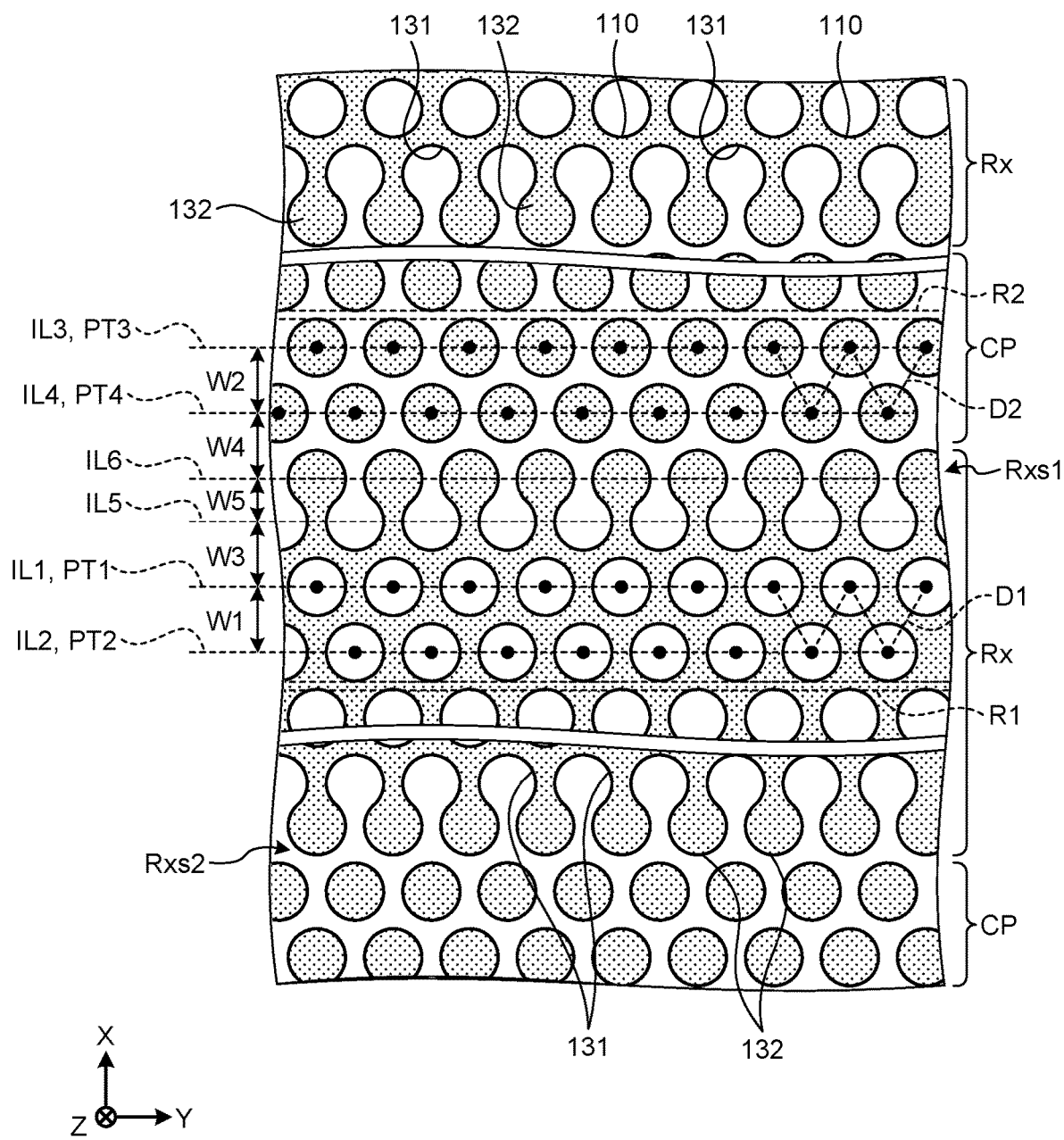
FIG. 12 is a schematic of the detection electrodes and the non-detection region according to a fifth modification in planar view.
Figure 13:
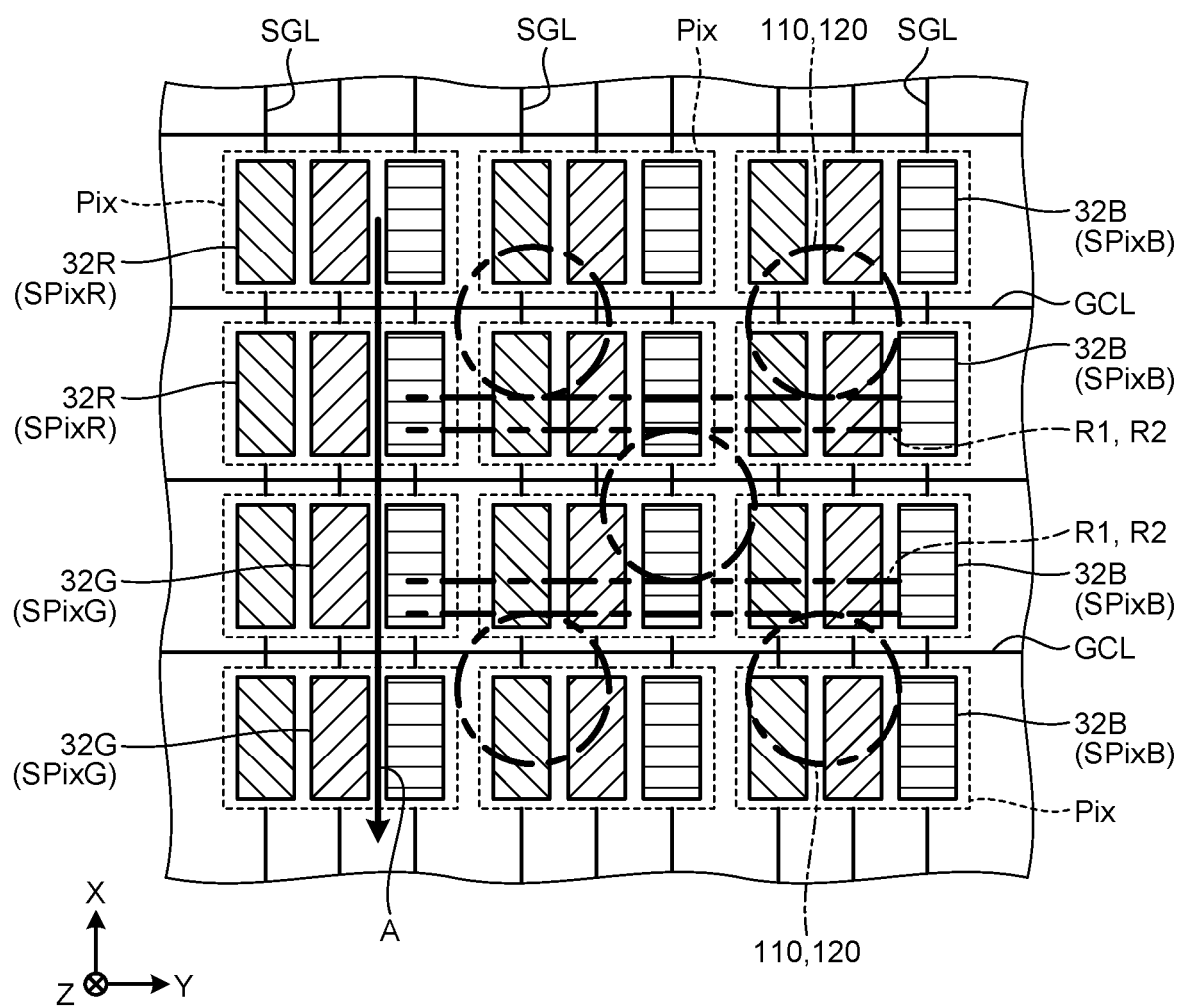
FIG. 13 is a schematic of the relation between the sub-pixels and the detection electrodes according to the fifth modification.

FIG. 12 is a schematic of the detection electrodes and the non-detection region according to a fifth modification in planar view. FIG. 13 is a schematic of the relation between the sub-pixels and the detection electrodes according to the fifth modification. As illustrated in FIG. 12, the fifth modification is different from the first embodiment in that the detection electrodes Rx extend not in the X-direction but in the Y-direction. In other words, the electrode extending direction (first direction) of the detection electrodes Rx according to the present embodiment is the Y-direction, and the second direction intersecting the first direction is the X-direction. As a result, the extending direction of the first array PT1 to the fourth array PT4 in which the openings 110 of the detection electrode Rx and the dummy electrodes 120 are arrayed is changed to the Y-direction. In addition, the extending direction of the continuous regions R1 and R2 provided with no opening 110 or no dummy electrode 120 is also changed to the Y-direction (first direction). The widths W1, W2, W3, W4, and W5 according to the fifth modification are equal to those according to the first embodiment. In other words, the width W5 is shorter than the widths W1, W2, W3, and W4.

As illustrated in FIG. 13, the fifth modification is different from the first embodiment in that the array direction of the sub-pixels SPixR, the sub-pixels SPixG, and the sub-pixels SPixB is the Y-direction. In other words, the direction in which the color regions 32R, 32G, and 32B of the color filter 32 are arrayed is the Y-direction. Therefore, the same color array direction A of the sub-pixels SPix according to the fifth modification is the X-direction. The same color array direction A according to the fifth modification intersects the continuous regions R1 and R2. This configuration can make the intensities of light transmitted through the three color regions 32R, 32G, and 32B uniform, thereby preventing occurrence of moiré. In the fifth modification, the drive electrodes Tx and the signal lines SGL extend in the X-direction, and the drive electrode driver 14 and the source driver 13 are disposed in the peripheral region Gd in the X-direction of the substrate 21. The scanning lines GCL extend in the Y-direction, and the gate driver 12 is disposed in the peripheral region Gd in the Y-direction of the substrate 21.

Sixth Modification

Figure 14:
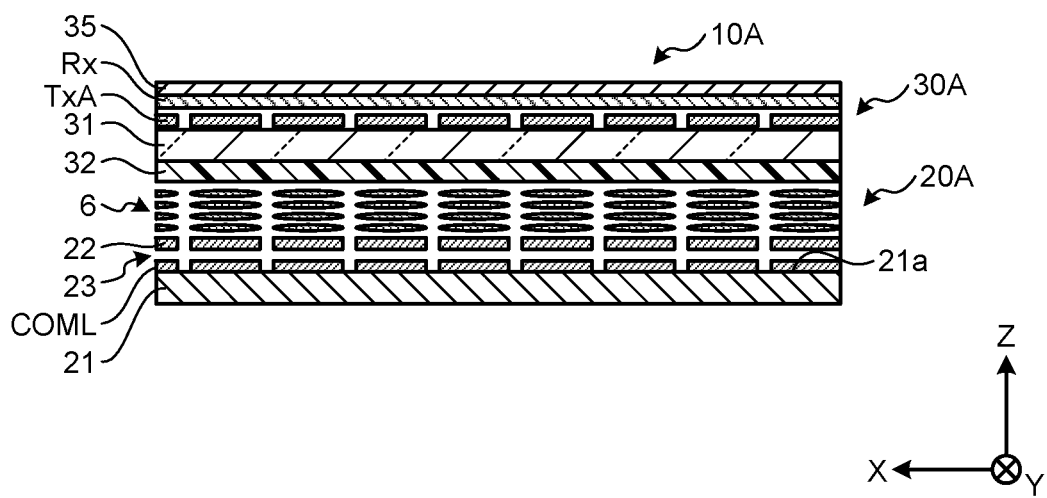
FIG. 14 is a sectional view of a schematic sectional structure of the display device according to a sixth modification.

FIG. 14 is a sectional view of a schematic sectional structure of the display device according to a sixth modification. As illustrated in FIG. 14, a panel part 10A according to the sixth modification is what is called an on-cell device in which a detector 30A serving as a detecting device that detects a touch is mounted on a display part 20A. In the on-cell device, the detector 30A may be provided directly on the display part 20 or may be provided not directly on the display part 20 but on it with another layer, such as the polarizing plate 35, interposed therebetween.

The display part 20A is provided with common electrodes COML instead of the drive electrodes Tx. The detector 30A includes drive electrodes TxA provided on the upper surface of the substrate 31 and the detection electrodes Rx provided on the substrate 31 separately from the common electrodes COML of the display part 20. The drive electrodes TxA are supplied with the detection drive signals VcomS. The drive electrodes TxA extend in the Y-direction. Therefore, the drive electrodes TxA and the detection electrodes Rx intersect with each other, thereby forming a mesh shape in planar view. An insulating layer is provided on the upper surface of the drive electrodes TxA.

In the sixth modification, the drive electrodes TxA supplied with the detection drive signals VcomS are provided separately from the drive electrodes COML supplied with the display drive signals VcomD. This configuration also prevents reflected light reflected by the ends Rxs1 and Rxs2 of the detection electrodes Rx from being linear light as described above. The mesh shape formed by the drive electrodes TxA and the detection electrodes Rx are hard to visually recognize. In addition, the occupancy ratio of the conductive material can be uniformized in all the regions including the detection electrodes Rx and the non-detection region CP. Consequently, the reflectance to incident light is equalized, and an image quality displayed on the display surface is improved.

Second Embodiment

Figure 15:
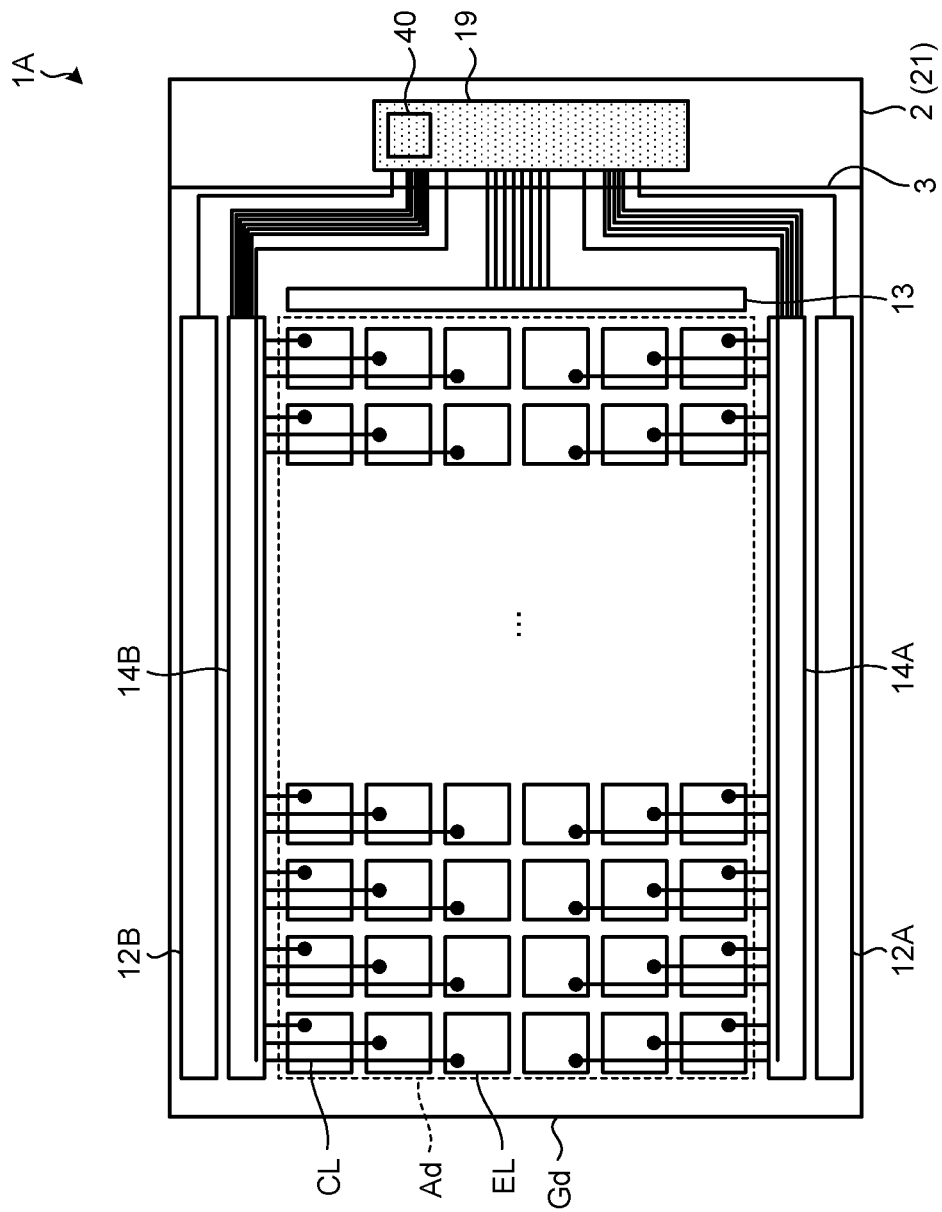
FIG. 15 is a diagram of an example of the display device according to a second embodiment.

FIG. 15 is a diagram of an example of the display device according to a second embodiment. The following describes a display device 1A according to the second embodiment. The display device according to the second embodiment employs a self-capacitance system. As illustrated in FIG. 15, the display device 1A according to the second embodiment includes electrodes EL provided in a matrix (row-column configuration). The electrode EL is used as an electrode that implements the functions of both the detection electrode Rx and the drive electrode Tx. Each electrode EL is coupled to the drive electrode scanner 14A or 14B and the detection circuit 40 via a coupling part, such as coupling wiring CL. The electrode EL may have a desired shape or size and may have a size corresponding to the size of the pixel, for example. In this case, the electrode EL according to the present embodiment may also serve as the common electrode COML constituting the display part 20. The electrode EL is not limited thereto and may be disposed for each pixel SPix of the display part 20 to serve as the pixel electrode 22. In this case, the detection electrode Rx described above need not be provided. The electrodes EL may be disposed on the substrate 31 similarly to the detection electrodes Rx according to the first embodiment. In the display device 1A, the electrodes EL are coupled to the detection circuit 40 incorporated in the IC chip 19 disposed on the substrate 21. If the electrodes EL are provided on the substrate 31, they may be coupled to the detection circuit 40 incorporated in the detection driver IC formed on the wiring substrate P coupled to the substrate 21 similarly to the first embodiment.

Figure 16:
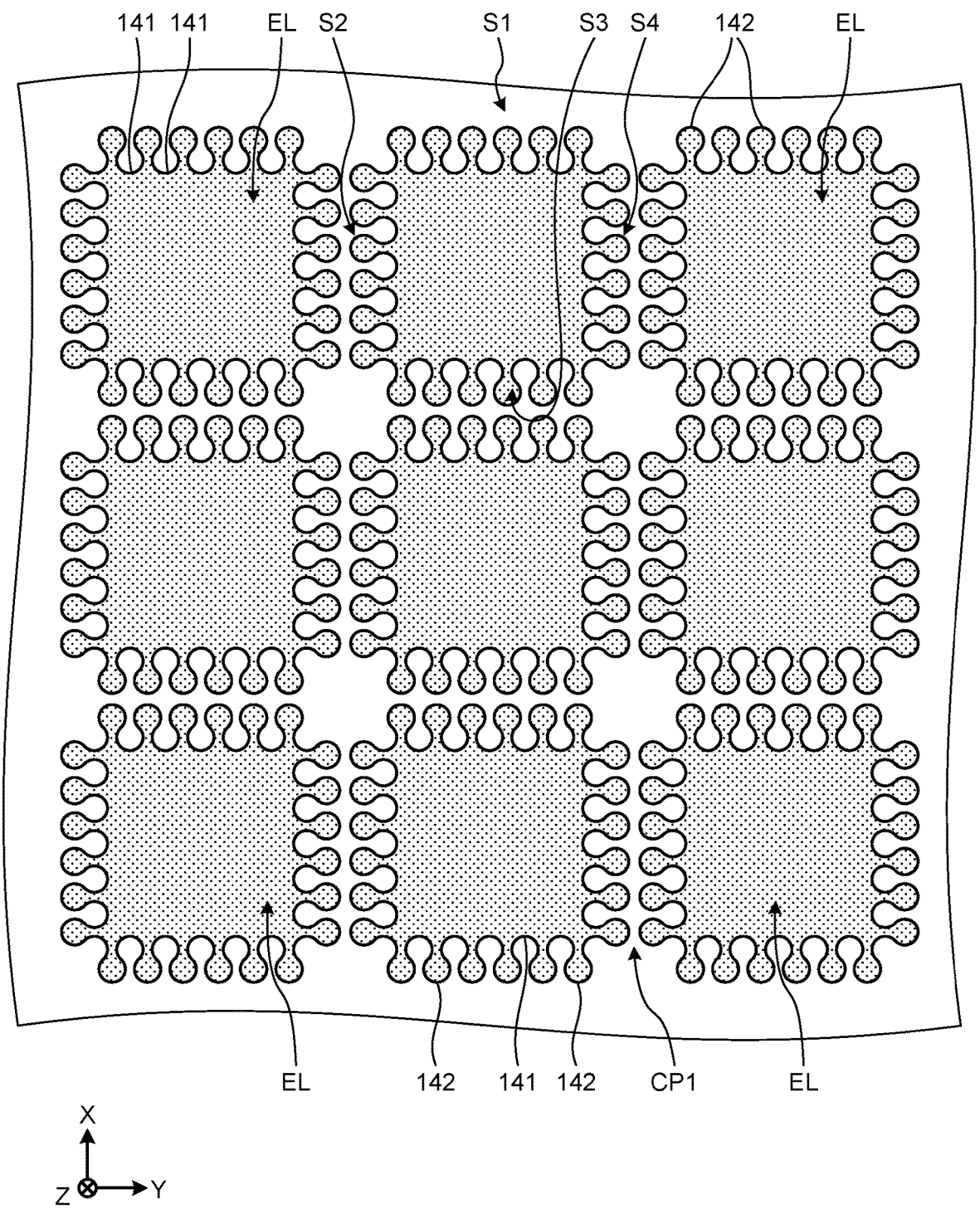
FIG. 16 is a plan view of some electrodes extracted from the display device according to the second embodiment in planar view.

FIG. 16 is a plan view of some electrodes extracted from the display device according to the second embodiment in planar view. The electrode EL has equal lengths in the X- and Y-directions and is formed into substantially a square in planar view. The electrodes EL are periodically arrayed in the X- and Y-directions. A non-detection region CP1 provided with no conductive material is formed between the electrodes EL adjacent to each other. The non-detection region CP1 linearly extends in the X- and Y-directions. The electrode EL has four ends S1 to S4. The ends S1 and S3 extend in the Y-direction, and the ends S2 and S4 extend in the X-direction. The detection electrode EL is surrounded by the ends S1, S2, S3, and S4. The ends S1, S2, S3, and S4 each have recesses 141 and protrusions 142. The recess 141 has a circular arc shape recessed toward the inside (inside the plane) of the electrode EL, and the protrusion 142 has a circular arc shape protruding toward the outside (outside the plane) of the electrode EL. The shape of the recess 141 and the protrusion 142 is not strictly limited to a circular arc. The shape may be a circular arc formed by a polygon composed of a plurality of connected straight lines or may be an ellipse or other shapes. Forming the recess 141 and the protrusion 142 in a circular shape suppresses a change in the reflectance of external light if the relative angle between the user and the device is different.

Figure 17:
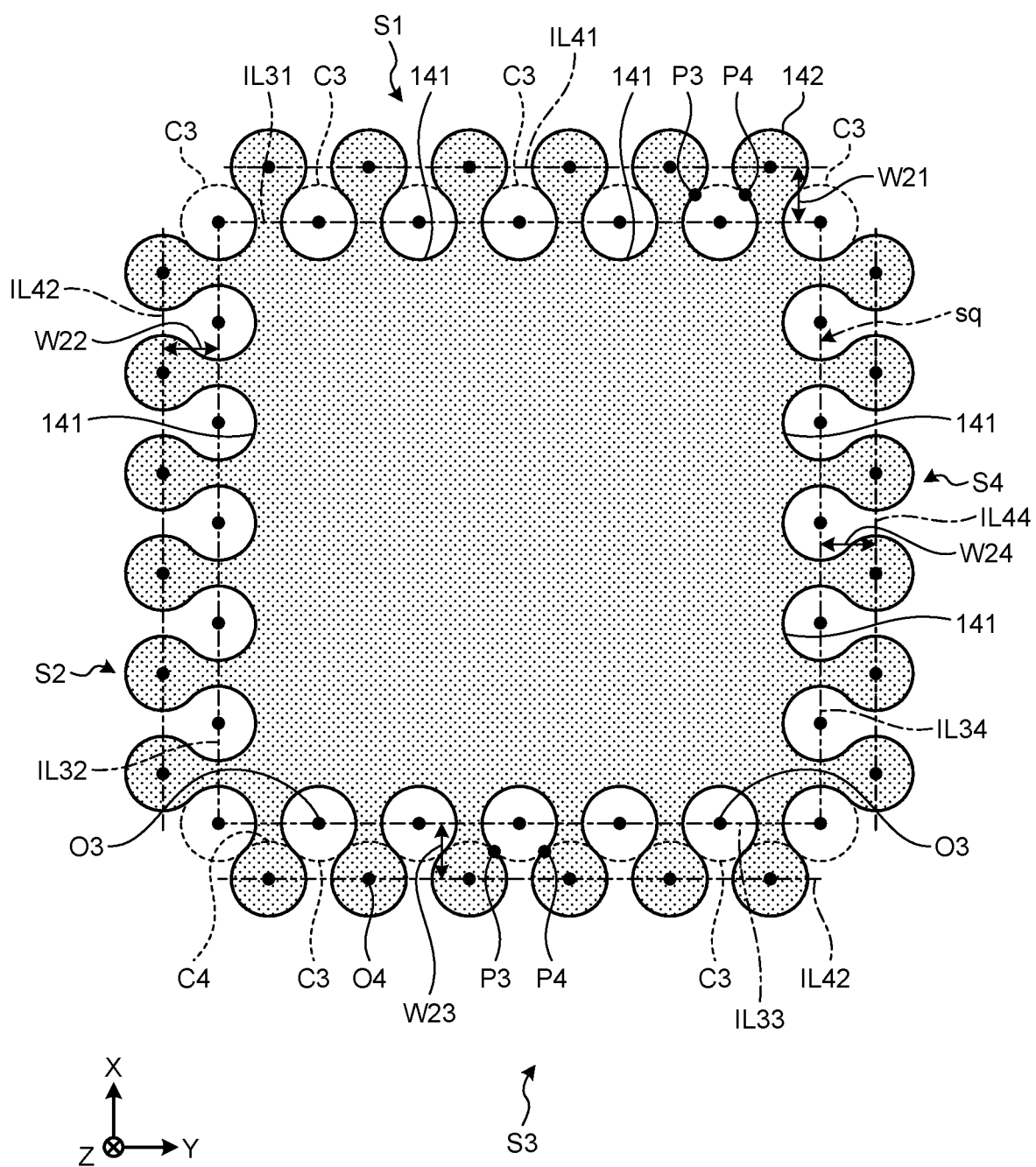
FIG. 17 is an enlarged view of an electrode EL illustrated in FIG. 16.

FIG. 17 is an enlarged view of part of FIG. 16. The recess 141 of the electrode EL extends along a third virtual circle C3. The protrusion 142 of the electrode EL extends along a fourth virtual circle C4. The third virtual circles C3 and the fourth virtual circles C4 are arrayed with regularity. The following describes the regularity of the third virtual circles C3 and the fourth virtual circles C4.

The line segments connecting centers O3 of the third virtual circles C3 of the recesses 141 constituting the ends S1 and S3 of the electrode EL are referred to as virtual lines IL31 and IL33, respectively. The virtual lines IL31 and IL33 extend in the Y-direction. The line segments connecting the centers O3 of the third virtual circles C3 of the recesses 141 constituting the ends S2 and S4 of the electrode EL are referred to as virtual lines IL32 and IL34, respectively. The virtual lines IL32 and IL34 extend in the X-direction. The virtual lines IL31, IL32, IL33, and IL34 constitute a virtual quadrilateral sq. While the virtual quadrilateral sq according to the present embodiment is a square, it is not limited to thereto. The virtual quadrilateral sq may have a rectangular shape with longer ends S extending in one of the directions. The third virtual circles C3 are formed at equal intervals in the extending directions of the virtual lines IL31, IL32, IL33, and IL34. The third virtual circles C3 are also formed at the corners where the virtual lines IL32 and IL34 extending in the X-direction intersect the virtual lines IL31 and IL33 extending in the Y-direction with their centers O3 overlapping the respective corners.

The line segments connecting the centers O4 of the fourth virtual circles C4 of the protrusions 142 constituting the ends S1 and S3 of the electrode EL are referred to as virtual lines IL41 and IL43, respectively. The virtual lines IL41 and IL43 extend in the Y-direction. The line segments connecting the centers O4 of the fourth virtual circles C4 of the protrusions 142 constituting the ends S2 and S4 of the electrode EL are referred to as virtual lines IL42 and IL44, respectively. The virtual lines IL42 and IL44 extend in the X-direction. The fourth virtual circles C4 are disposed at equal intervals in the extending directions of the virtual lines IL41, IL42, IL43, and IL44. The centers O4 of the fourth virtual circles C4 on the virtual lines IL41, IL42, IL43, and IL44 are each positioned between the third virtual circle C3 in the extending direction of the virtual lines IL41, IL42, IL43, and IL44. The distance between the virtual lines IL31 and IL41 is a width W21 in the X-direction. The distance between the virtual lines IL32 and IL42 is a width W22 in the Y-direction. The distance between the virtual lines IL33 and IL43 is a width W23 in the X-direction. The distance between the virtual lines IL34 and IL44 is a width W24 in the Y-direction. The widths W21, W22, W23, and W24 are substantially equal. The widths W21, W22, W23, and W24 have such a length that allows the fourth virtual circle C4 to be tangent to each of the third virtual circles C3 formed on both sides. In other words, the widths W21, W22, W23, and W24 each have a length smaller than the total of the radius of the third virtual circle C3 and the radius of the fourth virtual circle C4. The third virtual circle C3 and the fourth virtual circle C4 have points of tangency P3 and P4.

In the third virtual circle C3 and the fourth virtual circle C4 described above, the recess 141 is formed into a circular arc extending on the third virtual circle C3 and recessed toward the inside of the electrode EL. By contrast, the protrusion 142 is formed into a circular arc extending on the fourth virtual circle C4 and protruding toward the outside of the electrode EL. The recess 141 and the protrusion 142 extend to the points of tangency P3 and P4 on the third virtual circle C3 and the fourth virtual circle C4. The end of the recess 141 and the end of the protrusion 142 are coupled on the points of tangency P3 and P4.

As illustrated in FIG. 16, the electrodes EL have the same shape. Therefore, the recesses 141 face each other across the non-detection region CP1 between two electrodes EL. Similarly, the protrusions 142 face each other across the non-detection region CP1.

As described above, the ends S1, S2, S3, and S4 of the electrode EL according to the second embodiment have the recesses 141 and the protrusions 142 formed alternately and have a wave shape that alternately rises and falls. Therefore, the ends S1, S2, S3, and S4 of the electrode EL have no straight line part extending linearly. Consequently, the second embodiment prevents linear light reflected by the ends S1, S2, S3, and S4 of the electrode EL from being visually recognized.

Seventh Modification

Figure 18:
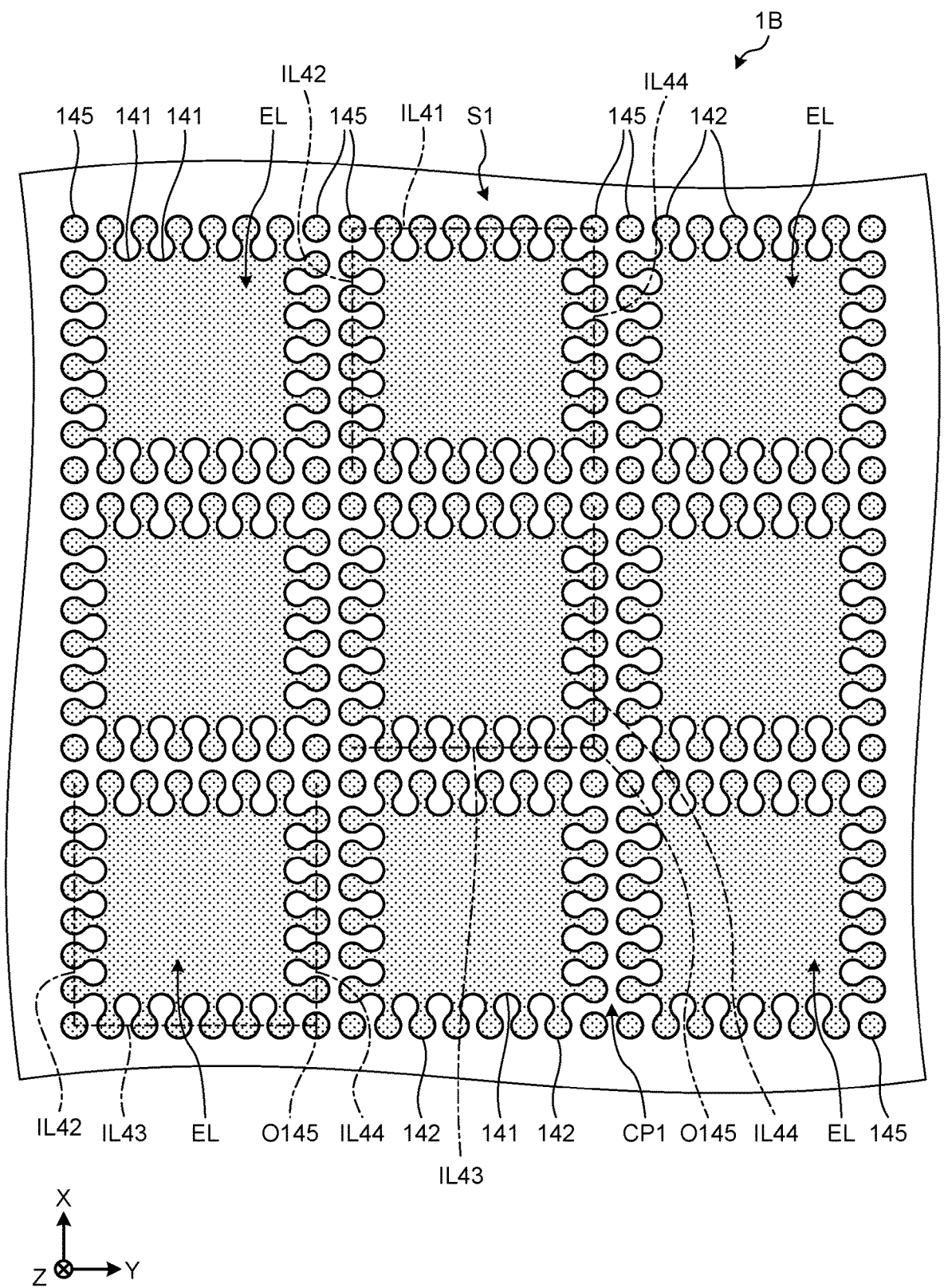
FIG. 18 is a plan view of some electrodes extracted from the display device according to a seventh modification in planar view.

FIG. 18 is a plan view of the electrodes extracted from the display device according to a seventh modification in planar view. As illustrated in FIG. 18, a display device 1B according to the seventh modification is different from the display device 1A according to the second embodiment in that it includes dummy electrodes 145. The dummy electrode 145 is formed into a circular shape in planar view and has the same diameter as that of the protrusion 142. Four dummy electrodes 145 are provided to one electrode EL. The dummy electrodes 145 are disposed outside the respective corners of the electrode EL. Centers O145 of the dummy electrodes 145 overlap the points of intersection of the virtual lines IL42 and IL44 extending in the X-direction and the virtual lines IL41 and IL43 extending in the Y-direction. As described above, the dummy electrodes 145 according to the seventh modification are disposed between the corners of the electrodes EL. Therefore, the seventh modification lowers the intensity of light transmitted between the corners of the electrodes EL in the non-detection region CP1 to equal to the intensity of light transmitted through the electrodes EL. Consequently, the seventh modification can reduce variations in reflectance to incident light.

Eighth Modification

Figure 19:
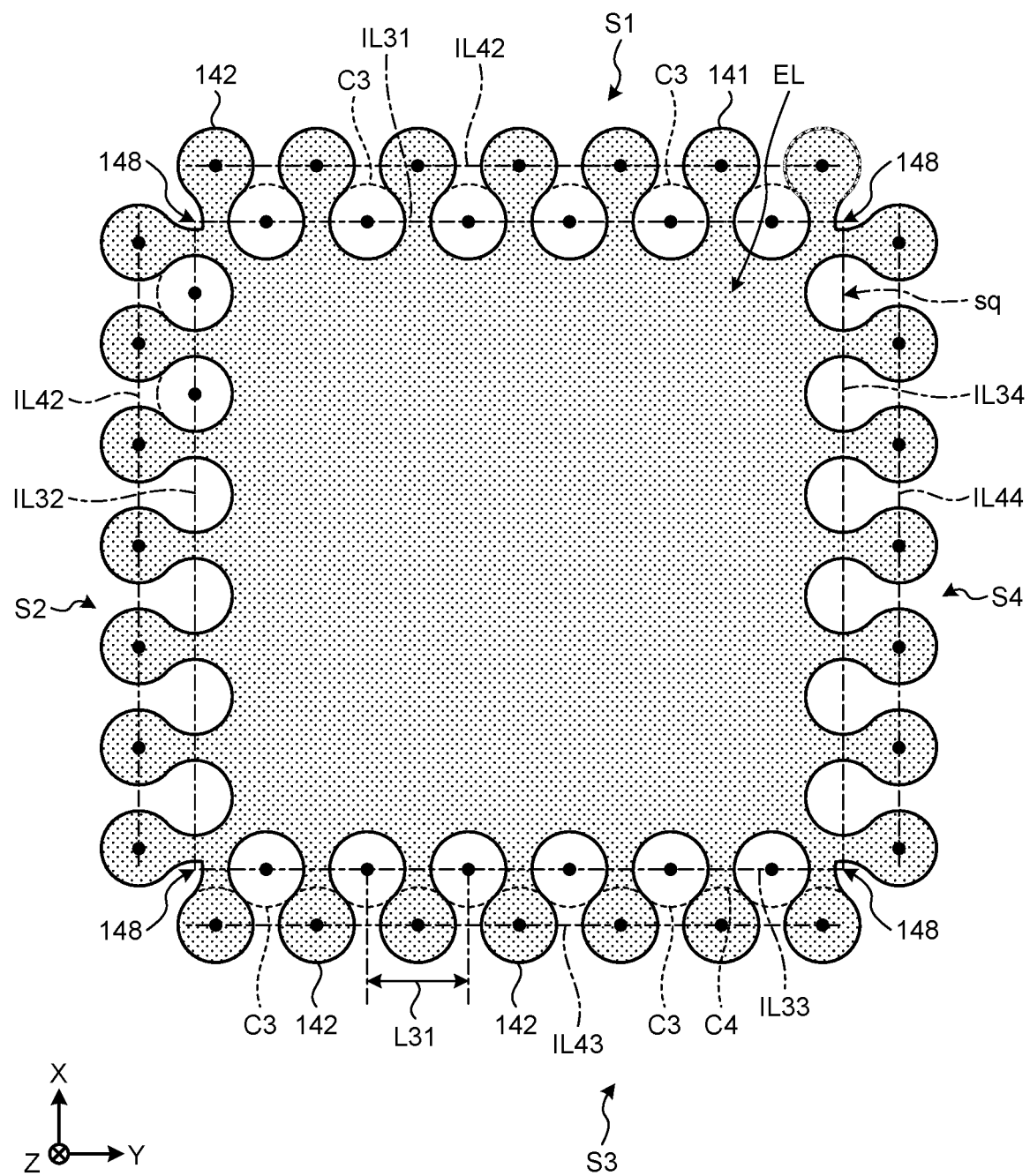
FIG. 19 is a plan view of the electrode extracted from the display device according to an eighth modification in planar view.
Figure 20:
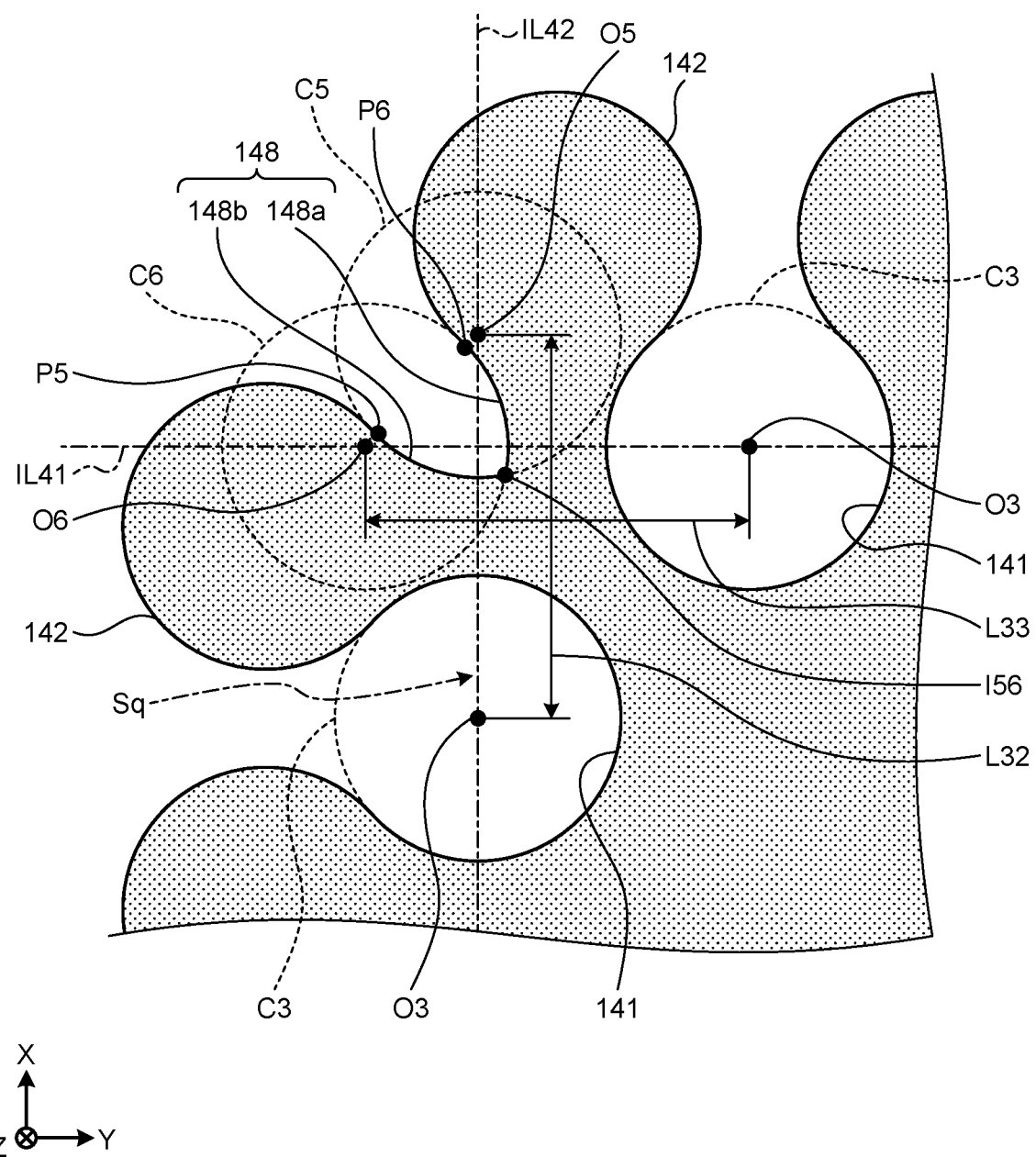
FIG. 20 is an enlarged view of a corner of the electrode illustrated in FIG. 19.

FIG. 19 is a plan view of the electrode extracted from the display device according to an eighth modification in planar view. FIG. 20 is an enlarged view of a corner of the electrode illustrated in FIG. 19. The electrode EL according to the eighth modification is different from the electrode EL according to the second embodiment in the shape of the corners.

As illustrated in FIG. 19, the ends S1, S2, S3, and S4 of the electrode EL according to the eighth modification have the recesses 141 and the protrusions 142 arrayed at equal intervals similarly to the second embodiment. The distance between the centers O3 of the third virtual circles C3 adjacent to each other is L31. The corners of the electrode EL according to the eighth modification each have a composite recess 148 formed by combined two circular arcs.

As illustrated in FIG. 20, the composite recess 148 is a combination of two partial recesses 148a and 148b. The partial recesses 148a and 148b are circular arcs extending along a fifth virtual circle C5 and a sixth virtual circle C6. The fifth virtual circle C5 and the sixth virtual circle C6 have the same diameter as that of the third virtual circle C3.

A center O5 of the fifth virtual circle C5 is positioned on the extension of one of the virtual lines IL42 and IL44 extending in the X-direction. A distance L32 between the center O5 of the fifth virtual circle C5 and the center O3 of the third virtual circle C3 is equal to the distance L31 (refer to FIG. 19) between the centers O3 of the third virtual circle C3. The fifth virtual circle C5 is tangent to the endmost protrusion 142 on the virtual lines IL42 and IL44 extending in the X-direction in one electrode EL and has a point of tangency P5. The partial recess 148a extends along the fifth virtual circle C5 and is coupled to the end of the protrusion 142 at the point of tangency P5.

A center O6 of the sixth virtual circle C6 is positioned on the extension of one of the virtual lines IL41 and IL43 extending in the Y-direction. A distance L33 between the center O6 of the sixth virtual circle C6 and the center O3 of the third virtual circle C3 is equal to the distance L31 (refer to FIG. 19) between the centers O3 of the third virtual circle C3. The sixth virtual circle C6 is tangent to the endmost protrusion 142 on the virtual lines IL1 and IL3 extending in the Y-direction in one electrode EL and has a point of tangency P6. The sixth virtual circle C6 intersects the fifth virtual circle C5 inside the virtual quadrilateral sq and has a point of intersection 156. The partial recess 148a extends along the sixth virtual circle C6 and is coupled to the end of the protrusion 142 at the point of tangency P5. The partial recesses 148a and 148b are coupled at the point of intersection 156.

As described above, the ends S1, S2, S3, and S4 of the electrode EL according to the eighth modification have no straight line part extending linearly. Consequently, the eighth modification prevents linear light reflected by the ends S1, S2, S3, and S4 of the electrode EL from being visually recognized.

Ninth Modification

Figure 21:
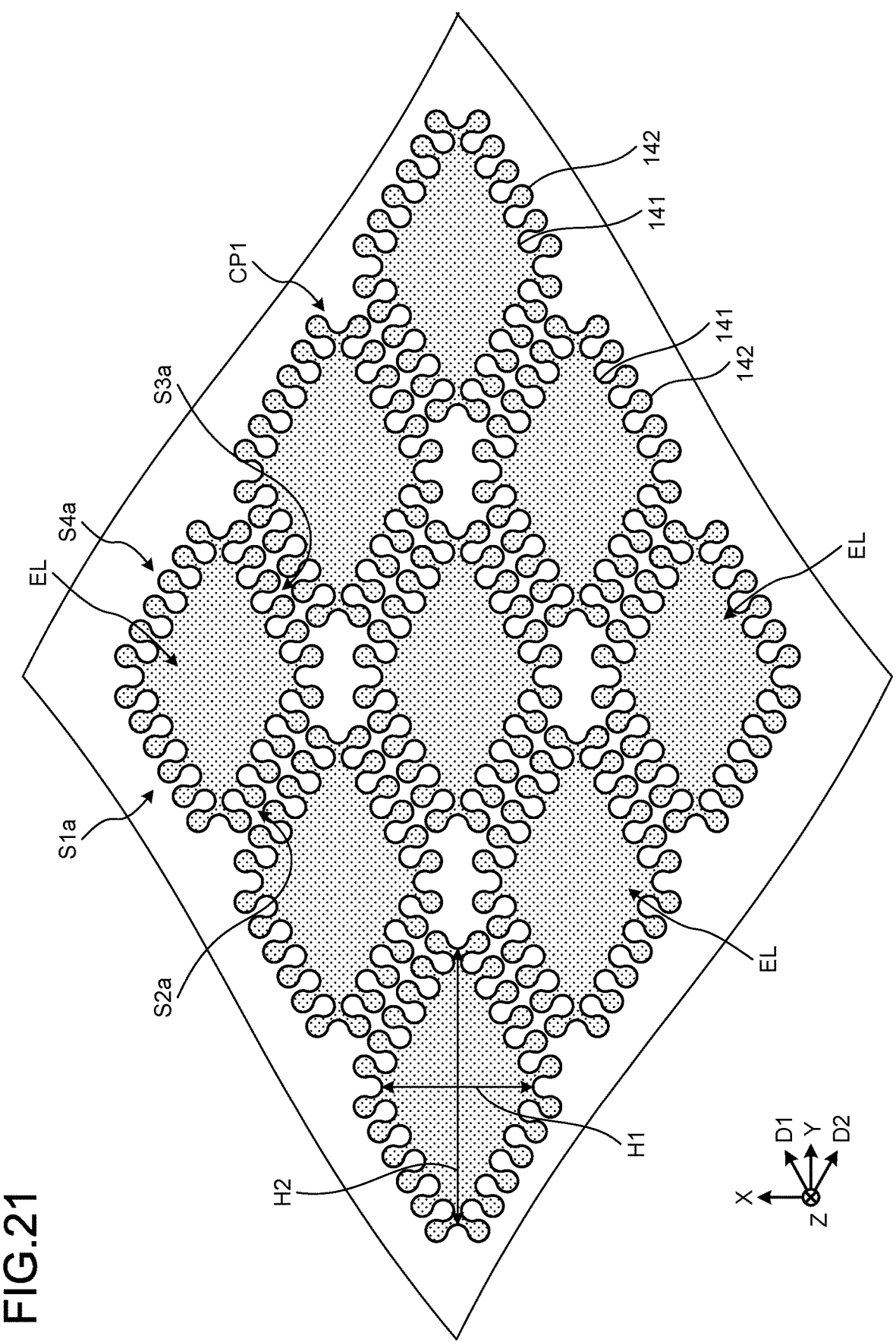
FIG. 21 is a plan view of the electrodes extracted from the display device according to a ninth modification in planar view.
Figure 22:
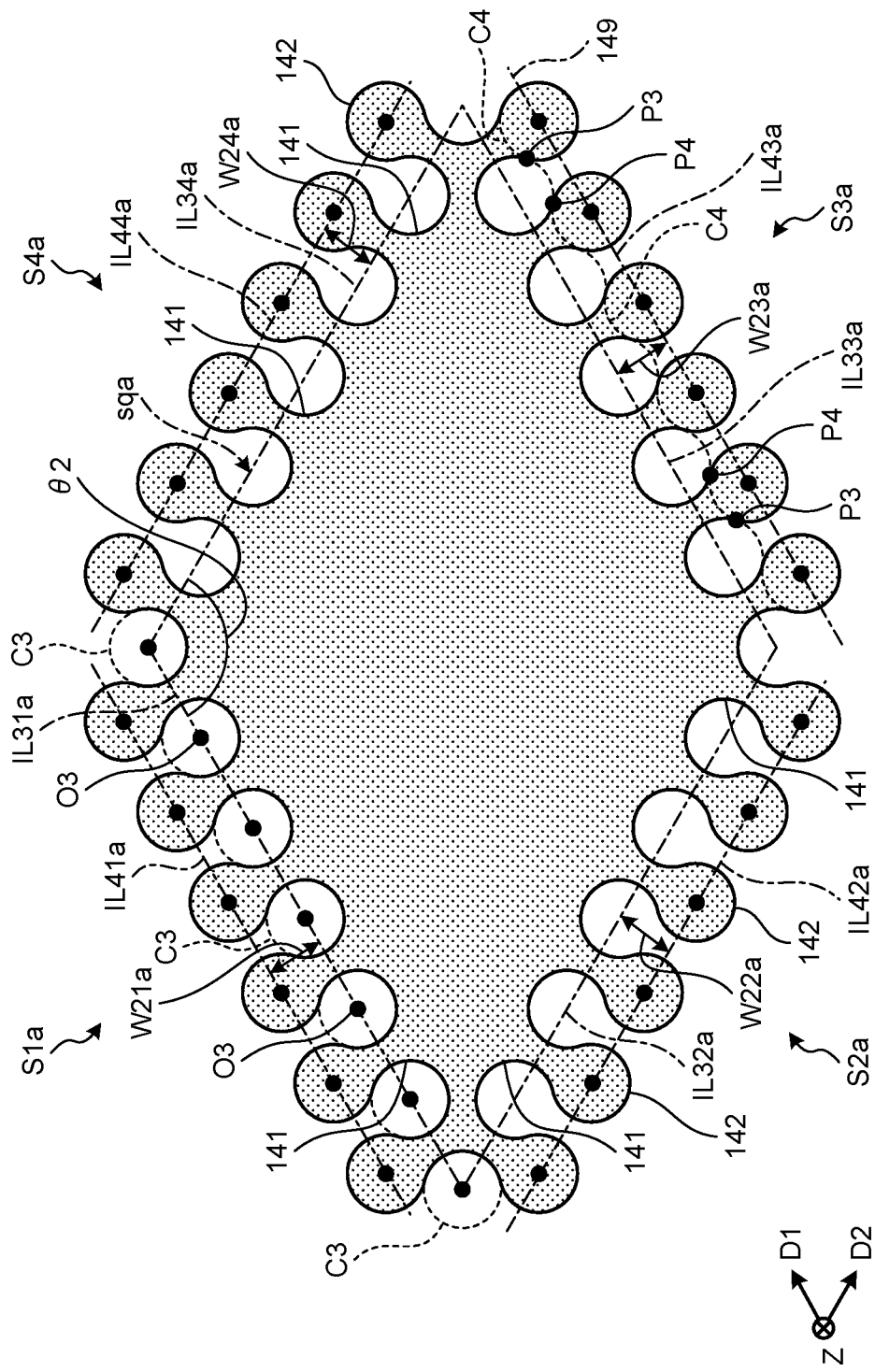
FIG. 22 is an enlarged view of the electrode illustrated in FIG. 21.

FIG. 21 is a plan view of the electrodes extracted from the display device according to a ninth modification in planar view. FIG. 22 is an enlarged view of the electrode illustrated in FIG. 21. The display device according to the ninth modification is different from the display device according to the second embodiment in the shape and the array direction of the electrodes EL.

The electrode EL has four ends S1a, S2a, S3a, and S4a. The electrode EL is formed into a rhombic shape with a first diagonal H1 extending in the X-direction and a second diagonal H2 extending in the Y-direction. In other words, the ends S1a and S3a each extend in a D1 direction at a first angle with respect to the X-direction, and the ends S2a and S4a each extend in a D2 direction at a second angle with respect to the X-direction. An angle θ2 (refer to FIG. 22) at which the ends S1a and S4a intersect is an angle other than 90 degrees, and specifically is 120 degrees in the ninth modification. The electrodes EL are arrayed such that the end S1a faces the end S3a and that the end S2a faces the end S4a across the non-detection region CP1. The ends S1a, S2a, S3a, and S4a each have the recesses 141 and the protrusions 142. The recess 141 has a circular arc shape recessed toward the inside of the electrode EL. The protrusion 142 has a circular arc shape protruding toward the outside of the electrode EL.

As illustrated in FIG. 22, the recess 141 extends along the third virtual circle C3. The protrusion 142 extends along the fourth virtual circle C4. The line segments connecting the centers O3 of the third virtual circles C3 of the recesses 141 constituting the ends S1a and S3a of the electrode EL are referred to as virtual lines IL31a and IL33a, respectively. The virtual lines IL31a and IL33a extend in the D1 direction. The line segments connecting the centers O3 of the third virtual circles C3 of the recesses 141 constituting the ends S2a and S4a of the electrode EL are referred to as virtual lines IL32a and IL34a, respectively. The virtual lines IL32a and IL34a extend in the D2 direction. The virtual lines IL31a, IL32a, IL33a, and IL34a constitute a virtual quadrilateral sqa. The virtual quadrilateral sqa is a rhombus. The third virtual circles C3 are formed at equal intervals on the virtual lines IL31a, IL32a, IL33a, and IL34a. The third virtual circles C3 are also formed at the corners where the virtual lines IL32a and IL34a extending in the D1 direction intersect the virtual lines IL31a and IL33a extending in the D2 direction with their centers O3 overlapping the respective corners.

The line segments connecting the centers O4 of the fourth virtual circles C4 of the protrusions 142 constituting the ends S1a and S3a of the electrode EL are referred to as virtual lines IL41a and IL43a, respectively. The virtual lines IL41a and IL43a extend in the D1 direction. The line segments connecting the centers O4 of the fourth virtual circles C4 of the protrusions 142 constituting the ends S2a and S4a of the electrode EL are referred to as virtual lines IL42a and IL44a, respectively. The virtual lines IL42a and IL44a extend in the D2 direction. The fourth virtual circles C4 are formed at equal intervals in the extending directions of the virtual lines IL41a, IL42a, IL43a, and IL44a. The centers O4 of the fourth virtual circles C4 on the virtual lines IL41a, IL42a, IL43a, and IL44a are each positioned between the third virtual circle C3 in the extending direction of the virtual lines IL41a, IL42a, IL43a, and Il44a. In addition, the fourth virtual circle C4 is tangent to both the third virtual circles C3 and has the points of tangency P3 and P4.

The distance between the virtual lines IL31a and IL41a is a width W21a in the X-direction. The distance between the virtual lines IL32a and IL42a is a width W22a in the Y-direction. The distance between the virtual lines IL33a and IL43a is a width W23a in the X-direction. The distance between the virtual lines IL34a and IL44a is a width W24a in the Y-direction. The widths W21a, W22a, W23a, and W24a are substantially equal.

The recess 141 is formed into a circular arc extending on the third virtual circle C3 and recessed toward the inside of the electrode EL. By contrast, the protrusion 142 is formed into a circular arc extending on the fourth virtual circle C4 and protruding toward the outside of the electrode EL. The recess 141 and the protrusion 142 extend to the points of tangency P3 and P4 on the third virtual circle C3 and the fourth virtual circle C4. Therefore, the end of the recess 141 and the end of the protrusion 142 are coupled on the points of tangency P3 and P4.

As described above, the ends S1a, S2a, S3a, and S4a of the electrode EL according to the ninth modification have no straight line part extending linearly. Consequently, the ninth modification prevents linear light reflected by the ends S1a, S2a, S3a, and S4a of the electrode EL from being visually recognized.

Tenth Modification

Figure 23:
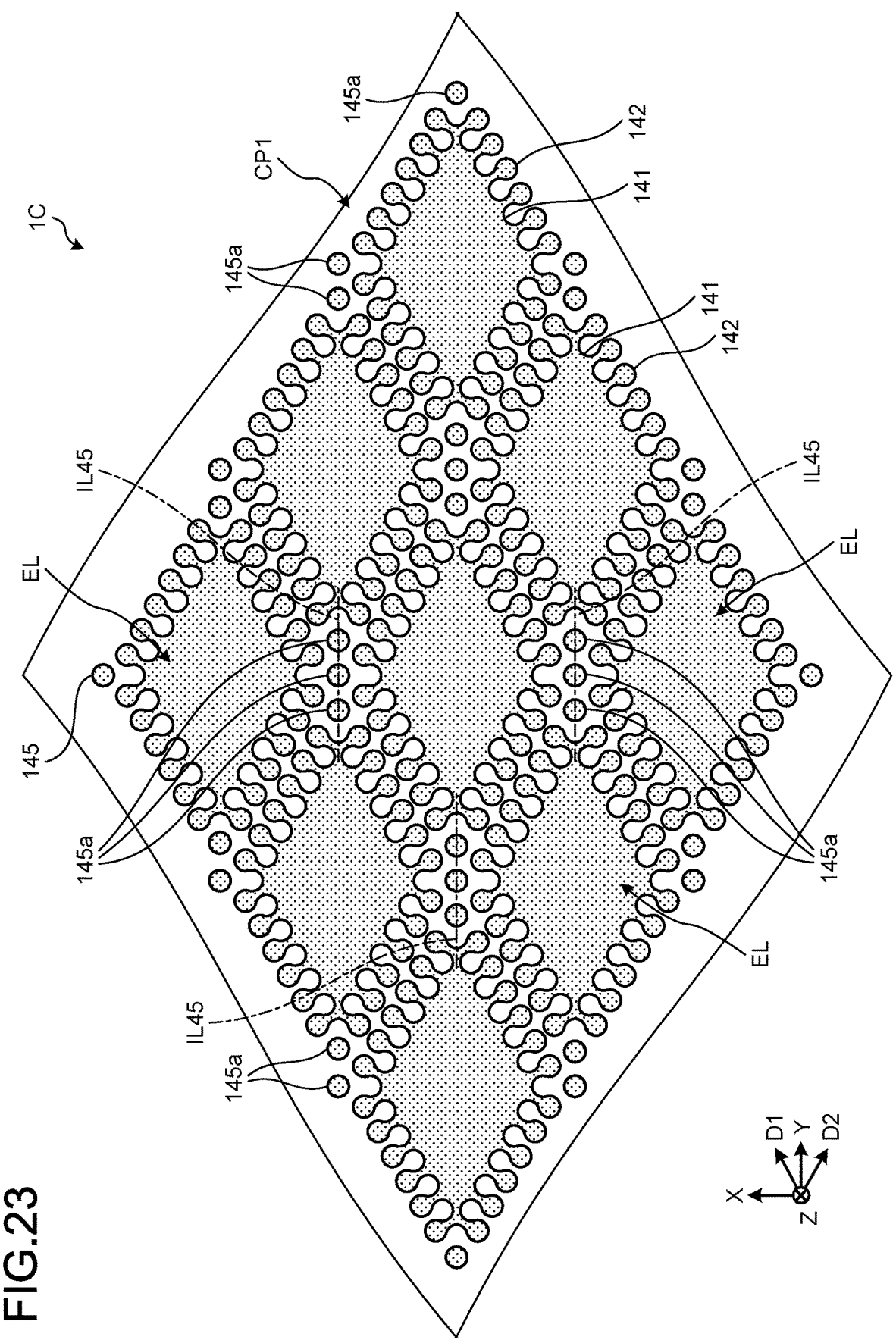
FIG. 23 is a plan view the electrodes extracted from the display device according to a tenth modification in planar view.

FIG. 23 is a plan view of the electrodes extracted from the display device according to a tenth modification in planar view. As illustrated in FIG. 23, a display device 1C according to the tenth modification is different from the display device according to the ninth modification in that it includes dummy electrodes 145a. The dummy electrode 145a is formed into a circular shape in planar view and has the same diameter as that of the protrusion 142. Three dummy electrodes 145a are provided between the corners of the electrodes EL. The three dummy electrodes 145a are arrayed along a virtual line IL145 connecting the corners of the electrodes EL adjacent to each other in the Y-direction. The virtual line IL145 extends in the Y-direction. As described above, the dummy electrodes 145a according to the tenth modification are disposed between the corners of the electrodes EL. Therefore, the tenth modification lowers the intensity of light transmitted between the corners of the electrodes EL to equal to the intensity of light transmitted through the electrodes EL. Consequently, the tenth modification can reduce variations in reflectance to incident light.

Eleventh Modification

Figure 24:
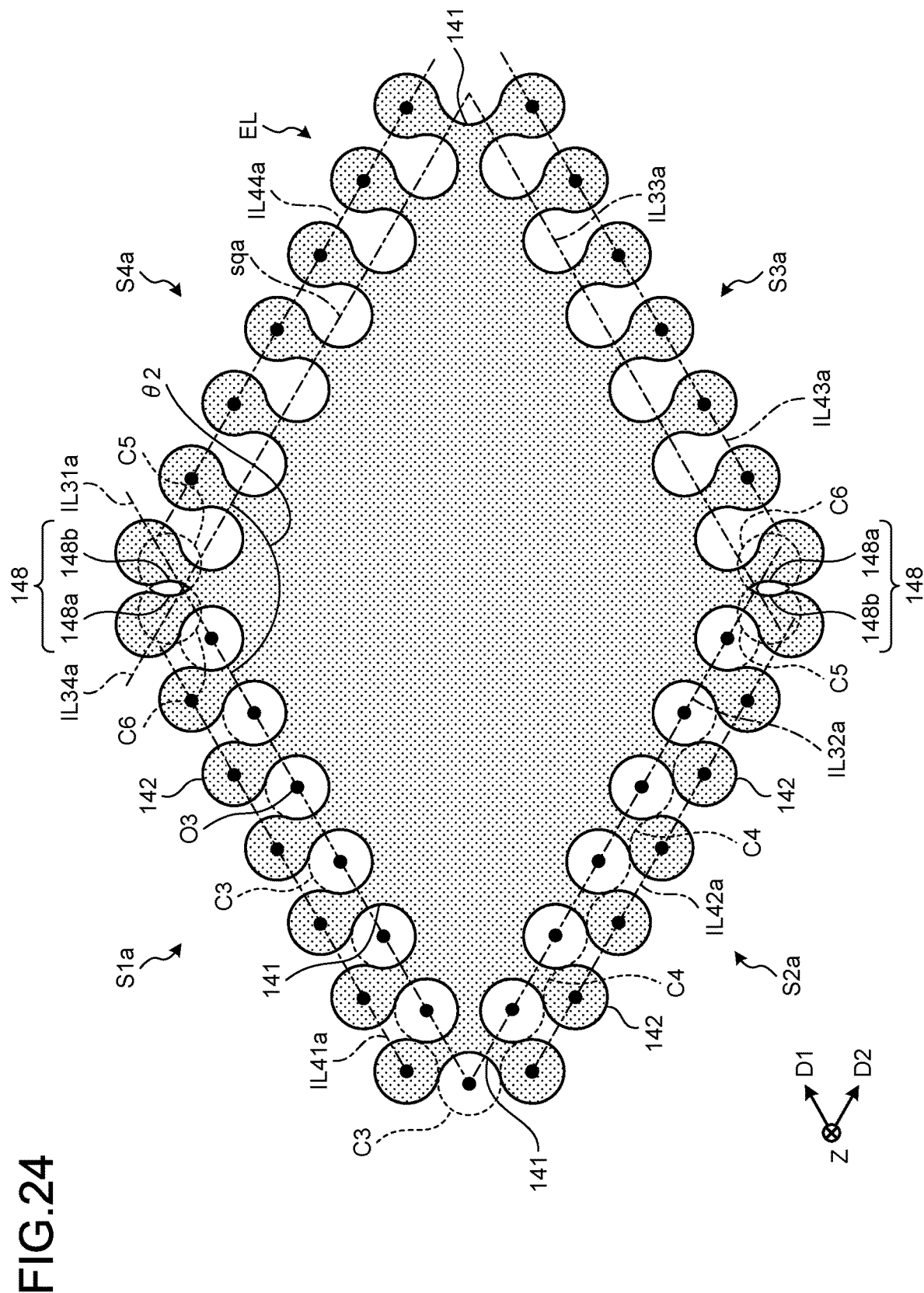
FIG. 24 is a plan view of the electrode extracted from the display device according to an eleventh modification in planar view.

FIG. 24 is a plan view of the electrode extracted from the display device according to an eleventh modification in planar view. The electrode EL according to the eleventh modification is different from the ninth modification in that two of the four corners each have the composite recess 148 having the partial recesses 148a and 148b. More specifically, the composite recess 148 is formed at the corner where the ends S1a and S4a intersect in the electrode EL. In addition, the composite recess 148 is formed at the corner where the ends S2a and S3a intersect. By contrast, the corner where the ends S1a and S2a intersect and the corner where the ends S3a and S4a intersect each have the recess 141. As described above, the ends S1a, S2a, S3a, and S4a of the electrode EL according to the eleventh modification have no straight line part extending linearly. Consequently, the eleventh modification prevents linear light reflected by the ends S1a, S2a, S3a, and S4a of the electrode EL from being visually recognized.

If the composite recess 148 is formed at the corner in the electrode EL having a rhombic shape, the distance between the protrusions 142 sandwiching the composite recess 148 is made closer. In other words, if the angle of the corner is larger than θ2, the protrusions 142 may possibly overlap each other. For this reason, if the angle θ2 of the corner is large, it is preferable to form the recess 141 instead of the composite recess 148 at the corner similarly to the ninth modification.

Twelfth Modification

Figure 25:
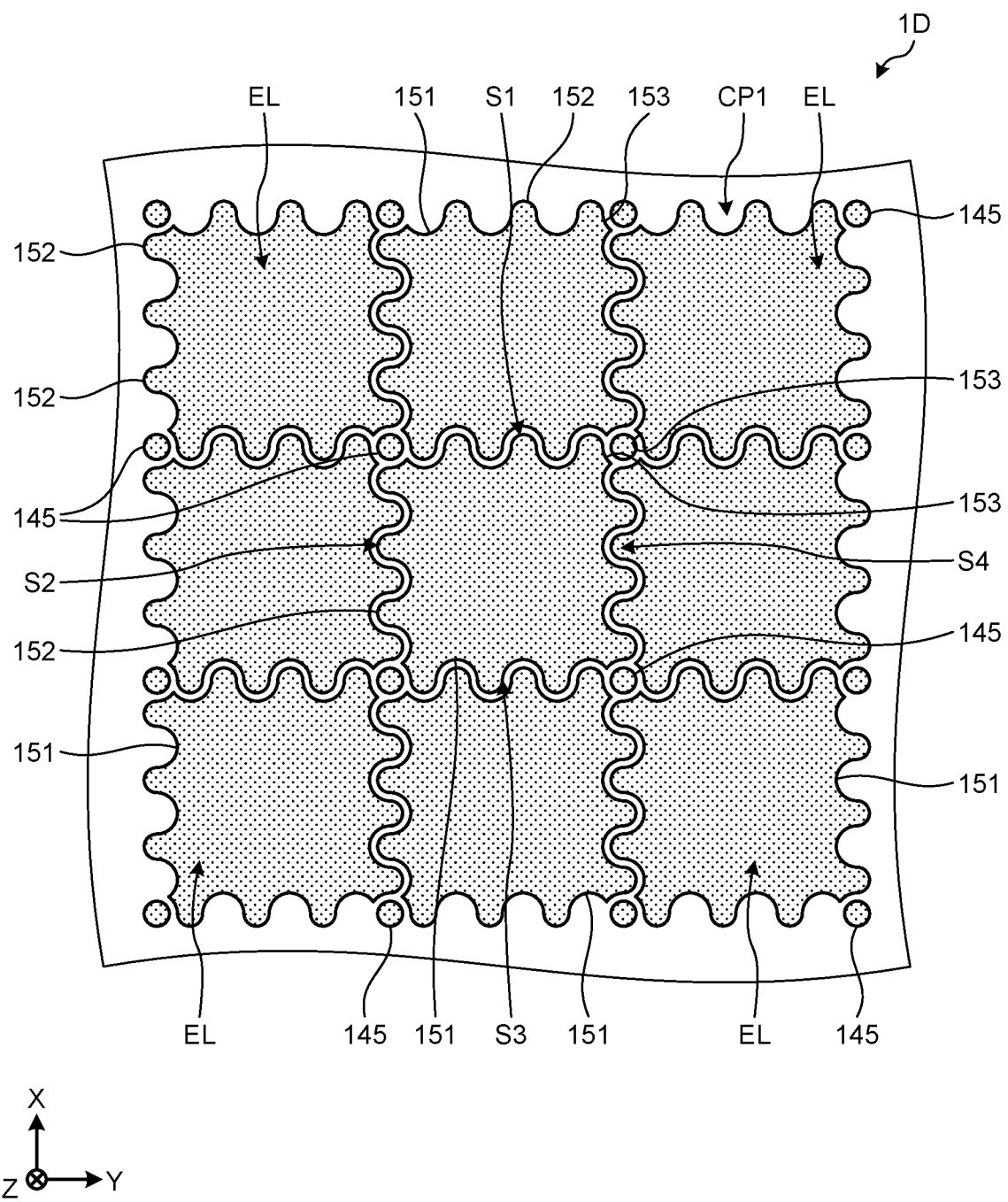
FIG. 25 is a plan view of the electrodes extracted from the display device according to a twelfth modification in planar view.
Figure 26:
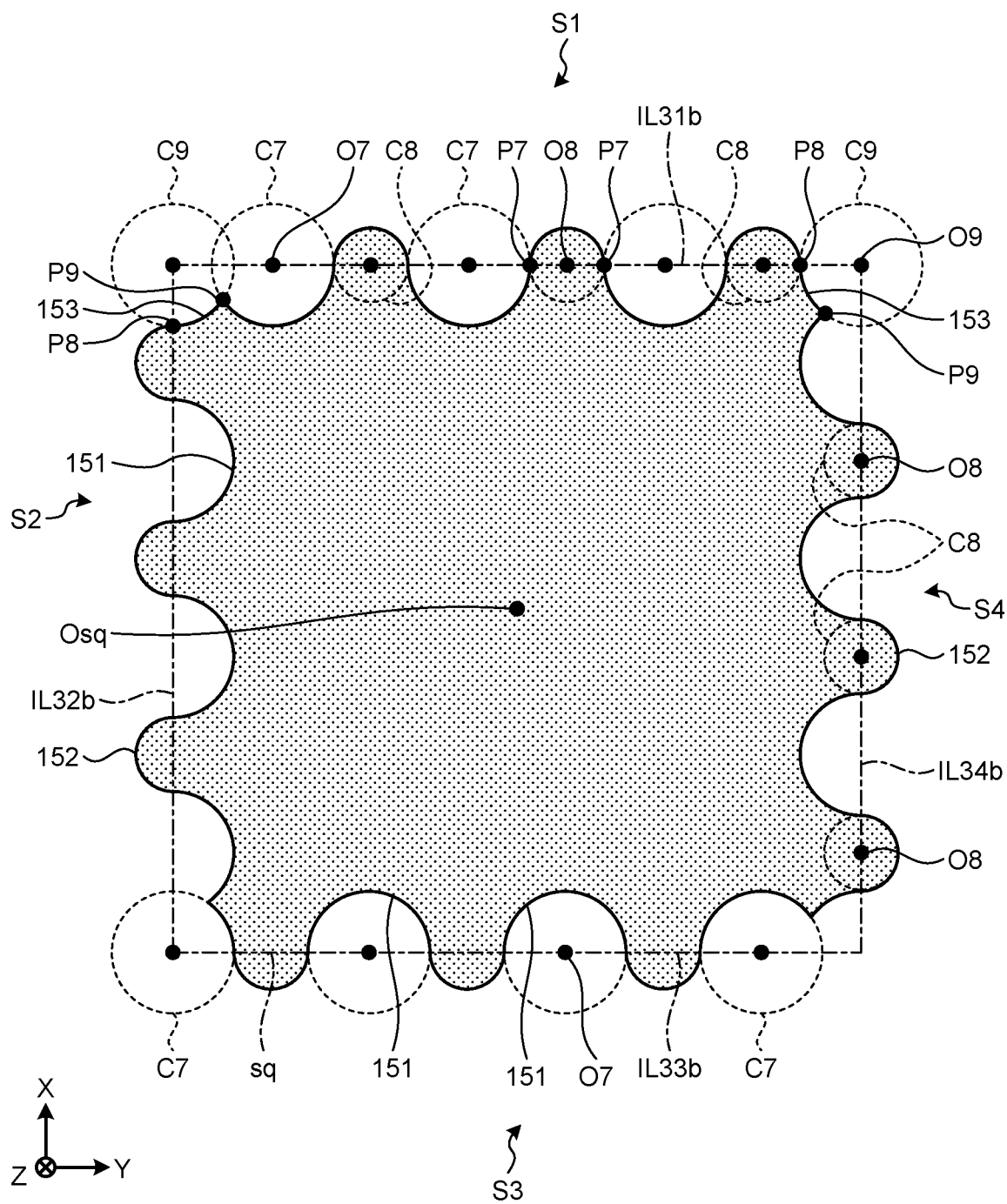
FIG. 26 is an enlarged view of the electrode illustrated in FIG. 25.

FIG. 25 is a plan view of the electrodes extracted from the display device according to a twelfth modification in planar view. FIG. 26 is an enlarged view of the electrode illustrated in FIG. 25. The display device according to the twelfth modification is different from the display device according to the second embodiment in the shape of the electrodes EL.

As illustrated in FIG. 25, a display device 1D according to the twelfth modification includes the electrodes EL and the circular dummy electrodes 145. The electrodes EL are arrayed in a matrix (row-column configuration), and the non-detection region CP1 linearly extends in the X- and Y-directions to form a grid. The electrode EL has a substantially square shape and has the four ends S1, S2, S3, and S4.

As illustrated in FIG. 26, the ends S1, S2, S3, and S4 each have recesses 151, protrusion 152, and recesses 153. The recess 151 has a circular arc shape recessed toward the inside of the electrode EL. The protrusion 152 has a circular arc shape protruding toward the outside of the electrode EL. The recess 151 has a circular arc shape extending along a seventh virtual circle C7. The protrusion 152 has a circular arc shape extending along an eighth virtual circle C8. The recess 153 has a circular arc shape extending along a ninth virtual circle C9. The seventh virtual circles C7, the protrusions 152, and the ninth virtual circles C9 are arrayed with regularity. The following describes the regularity of the seventh virtual circles C7, the protrusions 152, and the ninth virtual circles C9.

The line segments connecting centers O7 of the seventh virtual circles C7 of the recesses 151 constituting the ends S1 and S3 of the electrode EL are referred to as virtual lines IL31b and IL33b, respectively. The virtual lines IL31b and IL33b extend in the Y-direction. The line segments connecting the centers O7 of the seventh virtual circles C7 of the recesses 151 constituting the ends S2 and S4 of the electrode EL are referred to as virtual lines IL32b and IL34b, respectively. The virtual lines IL32b and IL34b extend in the X-direction. The virtual lines IL31b, IL32b, IL33b, and IL34b constitute the virtual quadrilateral sq. While the virtual quadrilateral sq according to the present embodiment is a square, it is not limited to thereto. The virtual quadrilateral sq may have a rectangular shape with longer ends S extending in one of the directions. The ninth virtual circles C9 are formed at the corners where the virtual lines IL32b and IL34b extending in the X-direction intersect the virtual lines IL31b and IL33b extending in the Y-direction with their centers O9 overlapping the respective corners. The seventh virtual circle C7 and the ninth virtual circle C9 have the same diameter, which is larger than that of the eighth virtual circle C8.

Centers O8 of the eighth virtual circles C8 are also positioned on the virtual lines IL31b, IL32b, IL3b, and IL34b. The seventh virtual circles C7 and the eighth virtual circles C8 are alternately arrayed in the extending direction of the virtual lines IL31b, IL32b, IL33b, and IL34b. The seventh virtual circle C7 and the eighth virtual circle C8 are formed to be tangent to each other. P7 in FIG. 26 denotes the point of tangency of the seventh virtual circle C7 and the eighth virtual circle C8.

The same number of seventh virtual circles C7 and eighth virtual circles C8 are formed. The eighth virtual circle C8 positioned at the trailing end of the virtual circle array including the seventh virtual circles C7 and the eighth virtual circles C8 is tangent to the ninth virtual circle C9. By contrast, the seventh virtual circle C7 positioned at the leading end of the virtual circle array including the seventh virtual circles C7 and the eighth virtual circles C8 intersects the ninth virtual circle C9. P8 in FIG. 26 denotes the point of tangency of the ninth virtual circle C9 and the eighth virtual circle C8. P9 in FIG. 26 denotes the point of intersection of the ninth virtual circle C9 and the seventh virtual circle C7.

With respect to the virtual circles described above, the recess 151 extends in a circular arc shape overlapping the seventh virtual circle C7 and is recessed toward the inside of the electrode EL. The protrusion 152 extends in a circular arc shape overlapping the eighth virtual circle C8 and protrudes toward the outside of the electrode EL. The recess 153 extends in a circular arc shape overlapping the ninth virtual circle C9. The end of the recess 151 and the end of the protrusion 152 are coupled on the point of tangency P7. The end of the recess 151 and the end of the recess 153 are coupled on the point of intersection P9. The end of the protrusion 152 and the end of the recess 153 are coupled at the point of tangency P8. Therefore, the ends S1, S2, S3, and S4 of the electrode EL have a wave shape that alternately rises and falls toward the outside and the inside of the electrode EL.

The shapes of the facing ends out of the ends S1, S2, S3, and S4 of the electrode EL are symmetric with respect to a point. Specifically, the facing ends S1 and S3 have the same shape when rotated 180 degrees about a center Osq of the virtual quadrilateral sq. Similarly, the facing ends S2 and S4 have the same shape when rotated 180 degrees about the center Osq of the virtual quadrilateral sq. Therefore, the recess 151 of the end S1 of a first electrode EL faces the protrusion 152 of the end S3 of a second electrode EL as illustrated in FIG. 25. The protrusion 152 of the end S1 of the first electrode EL faces the recess 151 of the end S3 of the second electrode EL. With this configuration, the electrodes EL do not interfere with each other if the gap between the electrodes EL is made small, and the electrodes EL are disposed close to each other.

Each dummy electrode 145 is disposed between the corners of four electrodes EL. The recesses 153 of the electrodes EL face the dummy electrode 145.

As described above, the ends S1, S2, S3, and S4 of the electrode EL according to the twelfth modification are formed by the recesses 151, the protrusions 152, and the recesses 153. Consequently, the twelfth modification prevents linear light reflected by the ends S1, S2, S3, and S4 of the electrode EL from being visually recognized. In addition, the twelfth modification lowers the intensity of light transmitted between the corners of the electrodes EL by the dummy electrodes 145 to equal to the intensity of light transmitted through the electrodes EL.

Thirteenth Modification

Figure 27:
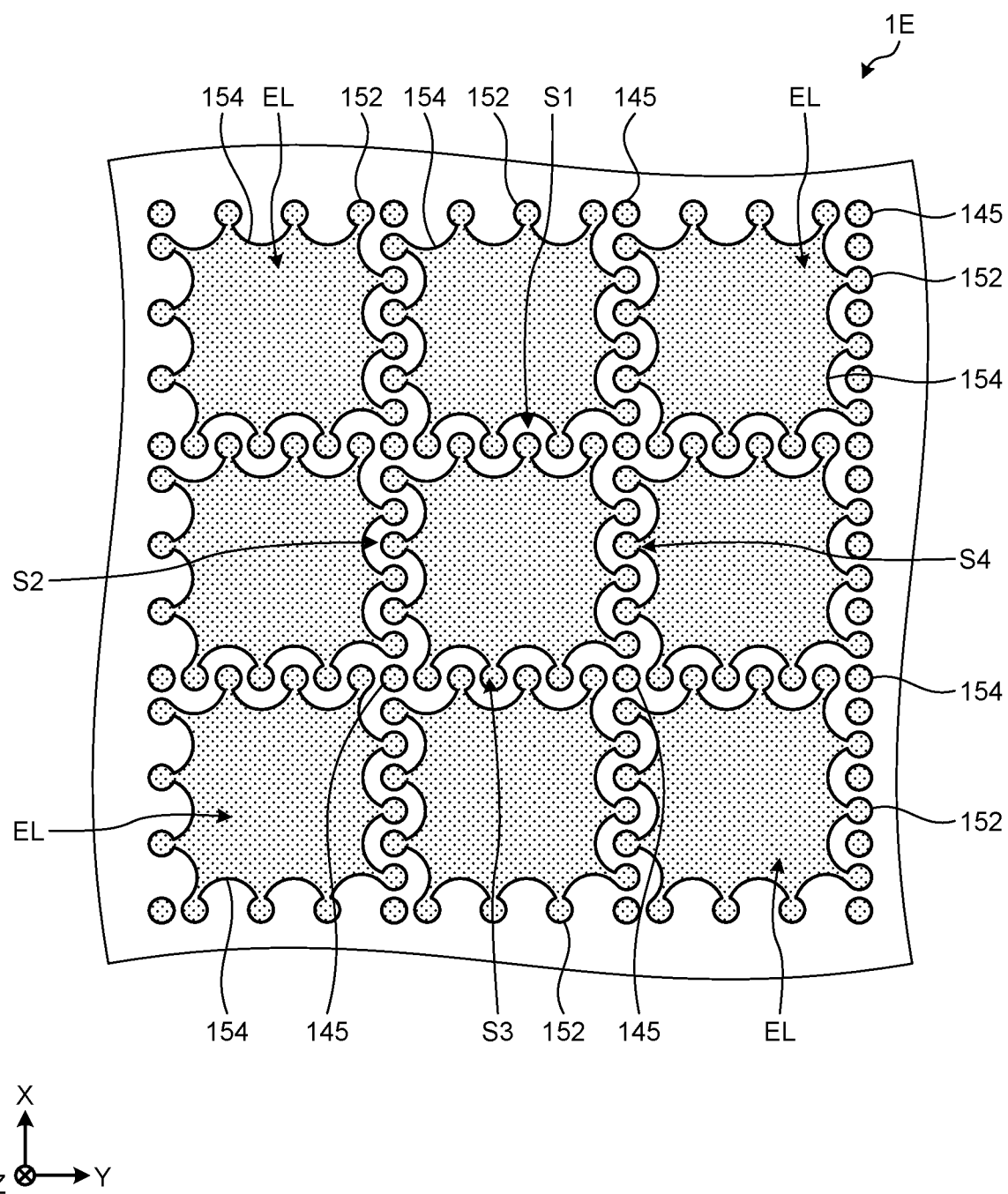
FIG. 27 is a plan view of the electrodes extracted from the display device according to a thirteenth modification in planar view.
Figure 28:
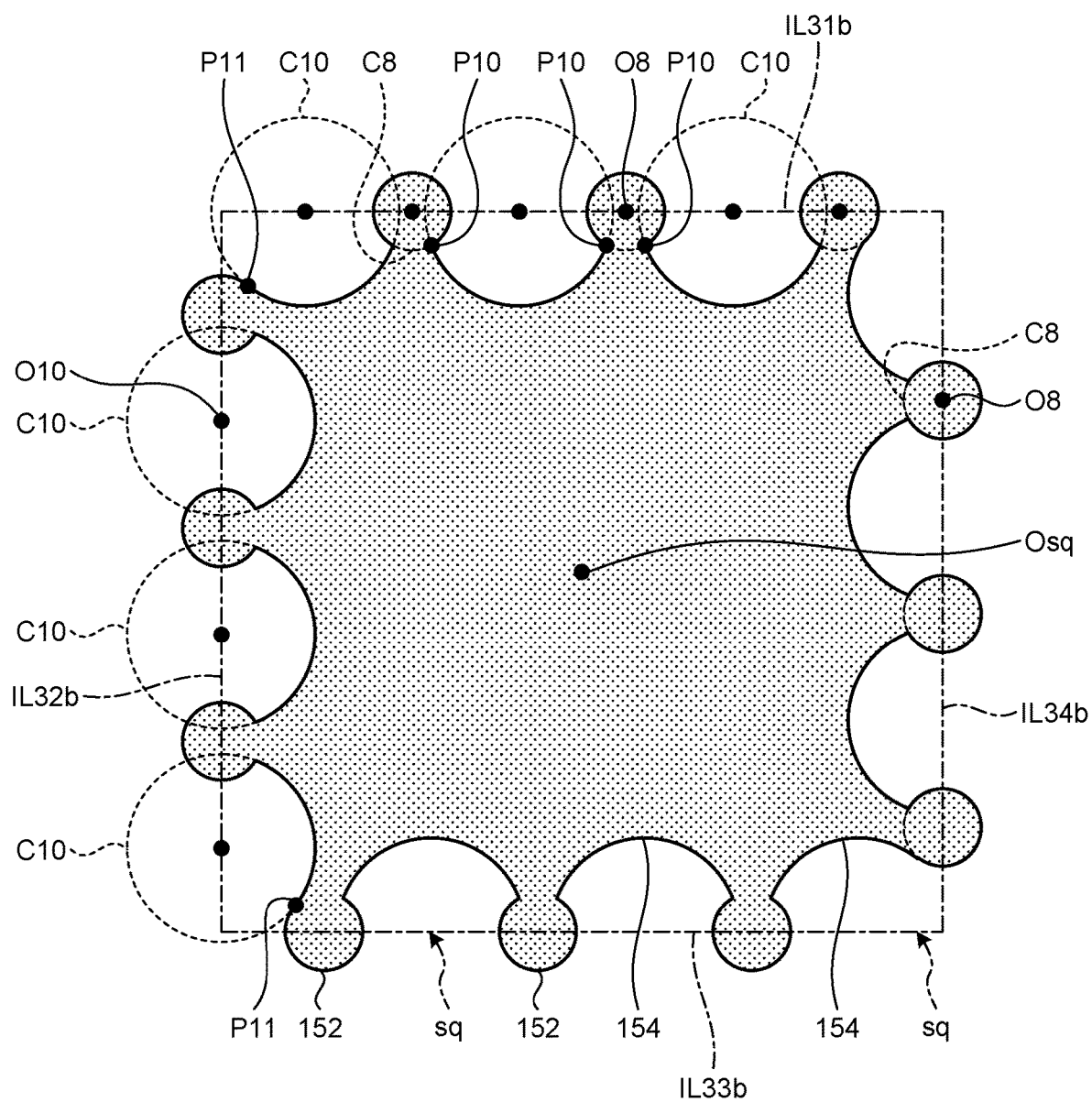
FIG. 28 is an enlarged view of the electrode illustrated in FIG. 27.

FIG. 27 is a plan view of the electrodes extracted from the display device according to a thirteenth modification in planar view. FIG. 28 is an enlarged view of the electrode illustrated in FIG. 27. As illustrated in FIG. 27, the electrode EL of a display device 1E according to the thirteenth modification is obtained by transforming the electrode EL according to the twelfth modification. More specifically, as illustrated in FIG. 28, the ends S1, S2, S3, and S4 each have recesses 154 and the protrusions 152. The recess 154 has a circular arc shape recessed toward the inside of the electrode EL. The protrusion 152 has a circular arc shape protruding toward the outside of the electrode EL. Thus, the electrode EL according to the thirteenth modification is different from the electrode EL according to the twelfth modification in that it has the recesses 154 instead of the recesses 151 and does not have the recesses 153.

The recess 154 has a circular arc shape extending along a tenth virtual circle C10. The tenth virtual circle C10 is obtained by increasing the diameter of the seventh virtual circle C7. In other words, a center O10 of the tenth virtual circle C10 coincides with the center O7 of the seventh virtual circle C7. The tenth virtual circle C10 intersects the adjacent eighth virtual circles C8 on the same line and has points of intersection P10. In addition, the tenth virtual circle C10 is tangent to the eighth virtual circle C8 on another line and has a point of tangency P11.

As described above, the ends S1, S2, S3, and S4 of the electrode EL according to the thirteenth modification are formed by the protrusions 152 and the recesses 154. Consequently, the thirteenth modification prevents linear light reflected by the ends S1, S2, S3, and S4 of the electrode EL from being visually recognized. The shapes of the facing ends out of the ends S1, S2, S3, and S4 of the electrode EL are symmetric with respect to a point. With this configuration, the electrodes EL do not interfere with each other if the gap between the electrodes EL is made small, and the electrodes EL are disposed close to each other.

Figure 29:
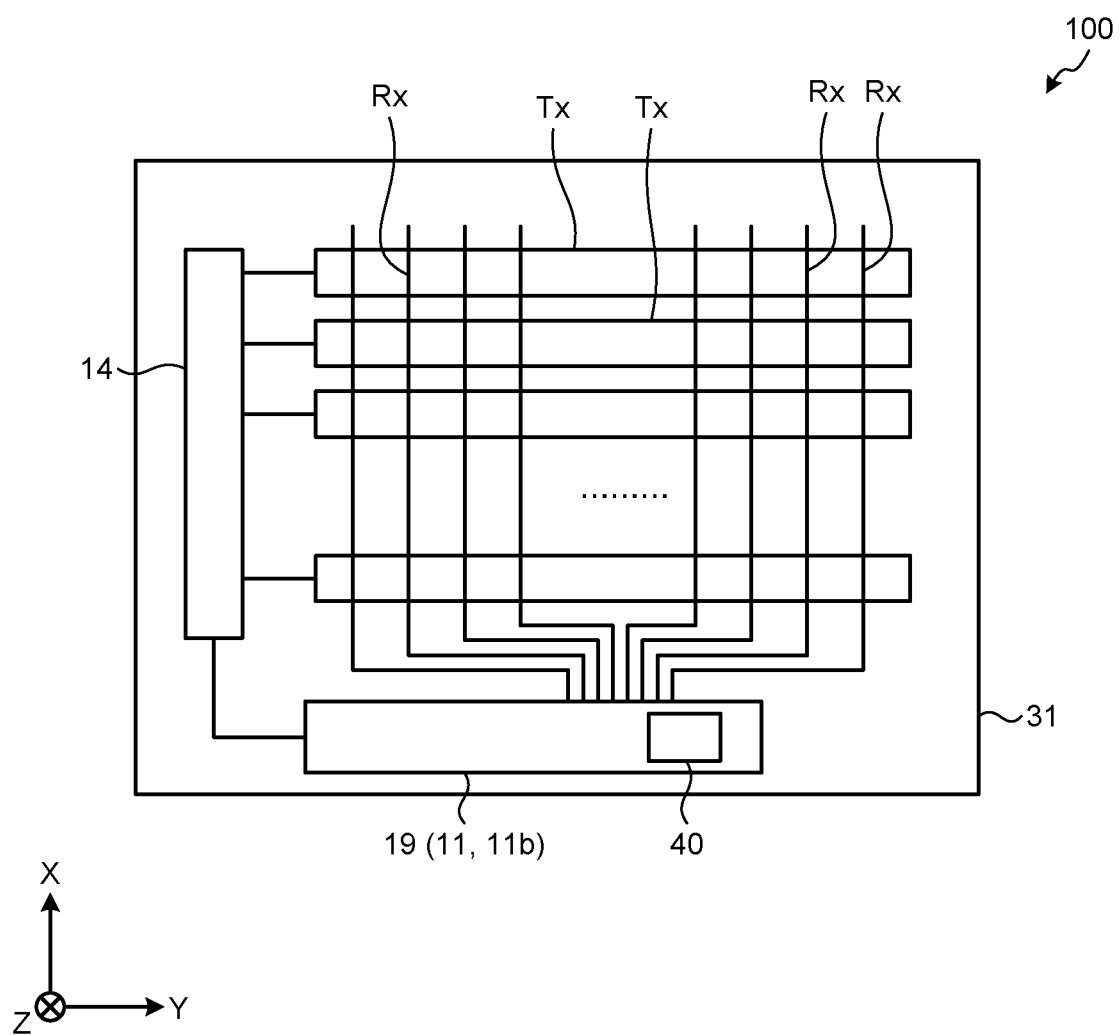
FIG. 29 is a diagram of an example of a main configuration of a detecting device.

FIG. 29 is a diagram of an example of the configuration of a detecting device. While the embodiments and the modifications above have described the examples of the display device including the display part, the present disclosure may be embodied as a detecting device 100 not including the display part 20. As illustrated in FIG. 29, the detecting device 100 includes the drive electrodes Tx and the detection electrodes Rx on the substrate 31, for example. The detecting device 100 includes the IC chip 19, the drive electrode driver 14, and the detection circuit 40. The IC chip 19 functions as the control circuit 11 (detection control circuit 11b). The drive electrode driver 14 supplies the drive signals VcomS to the drive electrodes Tx. The detection circuit 40 receives the detection signals output from the detection electrodes Rx.

What is claimed is:

1. A detecting device comprising:
    a plurality of detection electrodes extending in a first direction along a substrate and disposed apart from each other in a second direction orthogonal to the first direction; and
    a plurality of dummy electrodes provided between the detection electrodes, wherein
    the detection electrodes have a plurality of openings,
    the openings of the detection electrodes are arrayed in a triangular grid,
    the dummy electrodes are arrayed in a triangular grid,
    an end of each of the detection electrodes in the second direction has:
        a plurality of recesses each formed into a circular arc shape along a first virtual circle having the same diameter as the diameter of the opening of the detection electrode and recessed toward inside of the detection electrode; and
        a plurality of protrusions each formed into a circular arc shape along a second virtual circle having the same diameter as the diameter of the dummy electrode and protruding toward outside of the detection electrode,
        the recesses and the protrusions being alternately and continuously formed in the first direction,
    the first virtual circle and the second virtual circle are alternately arrayed in the first direction,
    the second virtual circle is tangent to two of the first virtual circles adjacent to each other in the first direction,
    the first virtual circle and two of the openings are disposed in a triangular grid, and
    the second virtual circle and two of the dummy electrodes are disposed in a triangular grid,
    a height of the triangular grid of the first virtual circle and the two of the openings is greater than at least one of:
        a height of an isosceles triangular grid of two of the first virtual circles and the second virtual circle; and
        a height of an isosceles triangular grid of two of the second virtual circles and the first virtual circle.

2. The detecting device according to claim 1, wherein the openings of the detection electrodes are arrayed in an equilateral triangular grid, and the dummy electrodes are arrayed in an equilateral triangular grid.

3. The detecting device according to claim 1, wherein the first virtual circle and the two openings are disposed in an equilateral triangular grid.

4. The detecting device according to claim 1, wherein the second virtual circle and the two dummy electrodes are disposed in an equilateral triangular grid.

5. The detecting device according to claim 1, wherein the first virtual circle and the two openings are disposed in an equilateral triangular grid, and the second virtual circle and the two dummy electrodes are disposed in an equilateral triangular grid.

6. A display device comprising:
the detecting device according to claim 1;
a display part; and
a color filter provided on a display surface of the display part, wherein
the color filter includes a first color filter provided in a first sub-pixel region, a second color filter provided in a second sub-pixel region, and a third color filter provided in a third sub-pixel region, the first color filter, the second color filter, and the third color filter being arrayed in order from one side to the other in the first direction, and
the first color filter, the second color filter, and the third color filter are each disposed with the color filter in the same color being adjacent thereto in the second direction.

7. A detecting device comprising:
a plurality of electrodes having a plane parallel to a substrate, wherein
the electrodes each have a rectangular shape surrounded by a plurality of ends,
each of the ends has:
a recess having a circular arc shape along a first virtual circle and recessed from outside toward inside of the plane; and
a protrusion having a circular arc shape along a second virtual circle and protruding from inside toward outside of the plane,
the recess and the protrusion are formed alternately and continuously along each of the ends of the electrode, and
the first virtual circle is tangent to the second virtual circle adjacent to the first virtual circle, at a tangent point.

8. The detecting device according to claim 7, wherein the shapes of the ends of the electrode are symmetric with respect to a center point of the electrode.

9. A display device comprising:
the detecting device according to claim 7; and
a display part.

10. The detecting device according to claim 7, wherein a center of the first virtual circle, the tangent point, and a center of the second virtual circle adjacent to the first virtual circle are aligned.

* * * * *